(12) United States Patent
Quigley et al.

(10) Patent No.: US 8,985,154 B2
(45) Date of Patent: Mar. 24, 2015

(54) HEATED PIPE AND METHODS OF TRANSPORTING VISCOUS FLUID

(75) Inventors: Peter A. Quigley, Duxbury, MA (US); Michael Feechan, Katy, TX (US)

(73) Assignee: Fiberspar Corporation, New Bedford, MA (US)

(*) Notice: Subject to any disclaimer, the term of this patent is extended or adjusted under 35 U.S.C. 154(b) by 1219 days.

(21) Appl. No.: 12/256,956

(22) Filed: Oct. 23, 2008

(65) Prior Publication Data

US 2009/0107558 A1 Apr. 30, 2009

Related U.S. Application Data

(60) Provisional application No. 60/981,858, filed on Oct. 23, 2007.

(51) Int. Cl.
*F16L 11/00* (2006.01)
*F16L 55/00* (2006.01)
*F16L 53/00* (2006.01)
*F16L 11/12* (2006.01)

(52) U.S. Cl.
CPC .............. *F16L 53/008* (2013.01); *F16L 11/12* (2013.01); *F16L 53/004* (2013.01)
USPC ............................. 138/33; 219/535; 219/643

(58) Field of Classification Search
CPC ........ F16L 11/12; F16L 53/008; F16L 53/004
USPC .......... 138/123–125, 129–133, 140, 103, 33; 219/628–631, 535, 643–644, 536, 541, 219/544, 551, 229, 446, 480, 486, 255, 510, 219/548; 137/1, 15.01, 341
See application file for complete search history.

(56) References Cited

U.S. PATENT DOCUMENTS

| 87,993 | A | 3/1869 | Weston |
| 142,388 | A | 9/1873 | Goble |
| 396,176 | A | 1/1889 | Simpson |
| 418,906 | A | 1/1890 | Bosworth |
| 482,181 | A | 9/1892 | Kellom |
| 646,887 | A | 4/1900 | Stowe et al. |
| 749,633 | A | 1/1904 | Seeley |
| 1,234,812 | A | 7/1917 | Simmmons |

(Continued)

FOREIGN PATENT DOCUMENTS

| BE | 559688 | 8/1957 |
| CH | 461199 | 8/1968 |

(Continued)

OTHER PUBLICATIONS

International Search Report mailed on Jan. 22, 2001.

(Continued)

*Primary Examiner* — Jianying Atkisson
(74) *Attorney, Agent, or Firm* — Goodwin Procter LLP

(57) ABSTRACT

The invention includes systems and methods for heating a fluid and transporting the fluid at an elevated temperature. The system includes a fiber reinforced spoolable pipe. This spoolable pipe may include an inner layer, at least one reinforcing layer, at least one heating element, and at least one insulation layer. The heating element may be located external to the inner layer. The invention also includes methods of deploying and rehabilitating a spoolable pipe for transporting a fluid at elevated temperature.

28 Claims, 10 Drawing Sheets

(56) References Cited

U.S. PATENT DOCUMENTS

| | | |
|---|---|---|
| 1,793,455 A | 2/1931 | Buchanan |
| 1,890,290 A | 12/1932 | Hargreaves |
| 1,930,285 A | 10/1933 | Robinson |
| 2,178,931 A | 11/1939 | Crites |
| 2,464,416 A | 3/1949 | Raybould |
| 2,467,520 A | 4/1949 | Brubaker |
| 2,481,001 A | 9/1949 | Burckle |
| 2,624,366 A | 1/1953 | Pugh |
| 2,648,720 A | 8/1953 | Alexander |
| 2,690,769 A | 10/1954 | Brown |
| 2,725,713 A | 12/1955 | Blanchard |
| 2,742,931 A | 4/1956 | Ganahl |
| 2,750,569 A | 6/1956 | Moon |
| 2,810,424 A | 10/1957 | Swartswelter et al. |
| 2,969,812 A | 1/1961 | Ganahl |
| 2,973,975 A | 3/1961 | Ramberg et al. |
| 2,991,093 A | 7/1961 | Guarnaschelli |
| 3,086,369 A | 4/1963 | Brown |
| 3,116,760 A | 1/1964 | Matthews |
| 3,170,137 A | 2/1965 | Brandt |
| 3,212,528 A | 10/1965 | Haas |
| 3,277,231 A | 10/1966 | Downey et al. |
| 3,306,637 A | 2/1967 | Press et al. |
| 3,334,663 A | 8/1967 | Peterson |
| 3,354,292 A * | 11/1967 | Kahn ........................... 392/468 |
| 3,354,992 A | 11/1967 | Cook et al. |
| 3,379,220 A | 4/1968 | Kiuchi et al. |
| 3,383,223 A | 5/1968 | Rose |
| 3,390,704 A | 7/1968 | Woodell |
| 3,413,169 A | 11/1968 | Krings et al. |
| 3,459,229 A | 8/1969 | Croft |
| 3,477,474 A | 11/1969 | Mesler |
| 3,507,412 A | 4/1970 | Carter |
| 3,522,413 A | 8/1970 | Chrow |
| 3,554,284 A | 1/1971 | Nystrom |
| 3,579,402 A | 5/1971 | Goldsworthy et al. |
| 3,589,135 A | 6/1971 | Ede et al. |
| 3,589,752 A | 6/1971 | Spencer et al. |
| 3,604,461 A | 9/1971 | Matthews |
| 3,606,396 A | 9/1971 | Prosdocimo et al. |
| 3,606,402 A | 9/1971 | Medney |
| 3,654,967 A | 4/1972 | Atwell et al. |
| 3,677,978 A | 7/1972 | Dowbenko et al. |
| 3,685,860 A | 8/1972 | Schmidt |
| 3,692,601 A | 9/1972 | Goldsworthy et al. |
| 3,696,332 A | 10/1972 | Dickson, Jr. et al. |
| 3,700,519 A | 10/1972 | Carter |
| 3,701,489 A | 10/1972 | Goldsworthy et al. |
| 3,728,187 A | 4/1973 | Martin |
| 3,730,229 A | 5/1973 | D'Onofrio |
| 3,734,421 A | 5/1973 | Karlson et al. |
| 3,738,637 A | 6/1973 | Goldsworthy et al. |
| 3,740,285 A | 6/1973 | Goldsworthy et al. |
| 3,744,016 A | 7/1973 | Davis |
| 3,769,127 A | 10/1973 | Goldsworthy et al. |
| 3,773,090 A | 11/1973 | Ghersa et al. |
| 3,776,805 A | 12/1973 | Hansen |
| 3,783,060 A | 1/1974 | Goldsworthy et al. |
| 3,790,438 A | 2/1974 | Lewis et al. |
| 3,814,138 A | 6/1974 | Courtot |
| 3,817,288 A | 6/1974 | Ball |
| 3,828,112 A | 8/1974 | Johansen et al. |
| 3,856,052 A | 12/1974 | Feucht |
| 3,858,616 A | 1/1975 | Thiery et al. |
| 3,860,040 A | 1/1975 | Sullivan |
| 3,860,742 A | 1/1975 | Medney |
| 3,866,633 A | 2/1975 | Taylor |
| 3,901,281 A | 8/1975 | Morrisey |
| 3,907,335 A | 9/1975 | Burge et al. |
| 3,913,624 A | 10/1975 | Ball |
| 3,932,559 A | 1/1976 | Cantor et al. |
| 3,933,180 A | 1/1976 | Carter |
| 3,956,051 A | 5/1976 | Carter |
| 3,957,410 A | 5/1976 | Goldsworthy et al. |
| 3,960,629 A | 6/1976 | Goldsworthy |
| 3,963,377 A | 6/1976 | Elliott et al. |
| 3,974,862 A | 8/1976 | Fuhrmann et al. |
| 3,980,325 A | 9/1976 | Robertson |
| RE29,112 E | 1/1977 | Carter |
| 4,001,442 A | 1/1977 | Stahlberger et al. |
| 4,007,070 A | 2/1977 | Busdiecker |
| 4,013,101 A | 3/1977 | Logan et al. |
| 4,032,177 A | 6/1977 | Anderson |
| 4,048,807 A | 9/1977 | Ellers et al. |
| 4,053,343 A | 10/1977 | Carter |
| 4,057,610 A | 11/1977 | Goettler et al. |
| 4,067,916 A | 1/1978 | Jaeger |
| 4,095,865 A | 6/1978 | Denison et al. |
| 4,108,701 A | 8/1978 | Stanley |
| 4,111,469 A | 9/1978 | Kavick |
| 4,114,393 A | 9/1978 | Engle, Jr. et al. |
| 4,119,122 A | 10/1978 | de Putter |
| 4,125,423 A | 11/1978 | Goldsworthy |
| 4,133,972 A | 1/1979 | Andersson et al. |
| 4,137,949 A | 2/1979 | Linko, III et al. |
| 4,139,025 A | 2/1979 | Carlstrom et al. |
| 4,148,963 A | 4/1979 | Bourrain et al. |
| 4,190,088 A | 2/1980 | Lalikos et al. |
| 4,200,126 A | 4/1980 | Fish |
| 4,220,381 A | 9/1980 | van der Graaf et al. |
| 4,226,446 A | 10/1980 | Burrington |
| 4,241,763 A | 12/1980 | Antal et al. |
| 4,248,062 A | 2/1981 | McLain et al. |
| 4,261,390 A | 4/1981 | Belofsky |
| 4,273,160 A | 6/1981 | Lowles |
| 4,303,263 A | 12/1981 | Legris |
| 4,303,457 A | 12/1981 | Johansen et al. |
| 4,306,591 A | 12/1981 | Arterburn |
| 4,307,756 A | 12/1981 | Voigt et al. |
| 4,308,999 A | 1/1982 | Carter |
| 4,336,415 A | 6/1982 | Walling |
| 4,351,364 A | 9/1982 | Cocks et al. |
| 4,380,252 A | 4/1983 | Gray et al. |
| 4,385,644 A | 5/1983 | Kaempen |
| 4,402,346 A | 9/1983 | Cheetham et al. |
| 4,421,806 A | 12/1983 | Marks et al. |
| 4,422,801 A | 12/1983 | Hale et al. |
| 4,434,816 A | 3/1984 | Di Giovanni et al. |
| 4,445,734 A | 5/1984 | Cunningham |
| 4,446,892 A | 5/1984 | Maxwell et al. |
| 4,447,378 A | 5/1984 | Gray et al. |
| 4,463,779 A | 8/1984 | Wink et al. |
| 4,469,729 A | 9/1984 | Watanabe et al. |
| 4,488,577 A | 12/1984 | Shilad et al. |
| 4,507,019 A | 3/1985 | Thompson |
| 4,515,737 A | 5/1985 | Karino et al. |
| 4,522,058 A | 6/1985 | Ewing |
| 4,522,235 A | 6/1985 | Kluss et al. |
| 4,530,379 A | 7/1985 | Policelli |
| 4,556,340 A | 12/1985 | Morton |
| 4,567,916 A | 2/1986 | Antal et al. |
| 4,578,675 A | 3/1986 | MacLeod |
| 4,606,378 A | 8/1986 | Meyer |
| 4,627,472 A | 12/1986 | Goettler et al. |
| 4,652,475 A | 3/1987 | Haney et al. |
| 4,657,795 A | 4/1987 | Foret et al. |
| 4,681,169 A | 7/1987 | Brookbank, III |
| 4,700,751 A | 10/1987 | Fedrick |
| 4,712,813 A | 12/1987 | Passerell et al. |
| 4,728,224 A | 3/1988 | Salama et al. |
| 4,729,106 A | 3/1988 | Rush et al. |
| 4,741,795 A | 5/1988 | Grace et al. |
| 4,758,455 A | 7/1988 | Campbell et al. |
| 4,789,007 A | 12/1988 | Cretel et al. |
| 4,842,024 A | 6/1989 | Palinchak |
| 4,844,516 A | 7/1989 | Baker |
| 4,849,668 A | 7/1989 | Crawley et al. |
| 4,854,349 A | 8/1989 | Foreman |
| 4,859,024 A | 8/1989 | Rahman |
| 4,869,293 A | 9/1989 | Botsolas |
| 4,903,735 A | 2/1990 | Delacour et al. |
| 4,913,657 A | 4/1990 | Naito et al. |
| 4,936,618 A | 6/1990 | Sampa et al. |
| 4,941,774 A | 7/1990 | Harmstorf et al. |

(56) References Cited

U.S. PATENT DOCUMENTS

| | | |
|---|---|---|
| 4,942,903 A | 7/1990 | Jacobsen et al. |
| 4,972,880 A | 11/1990 | Strand |
| 4,992,787 A | 2/1991 | Helm |
| 4,995,761 A | 2/1991 | Barton |
| 5,024,252 A | 6/1991 | Ochsner |
| 5,048,572 A | 9/1991 | Levine |
| 5,072,622 A | 12/1991 | Roach et al. |
| 5,077,107 A | 12/1991 | Kaneda et al. |
| 5,080,560 A | 1/1992 | LeRoy et al. |
| 5,090,741 A | 2/1992 | Yokomatsu et al. |
| 5,097,870 A | 3/1992 | Williams |
| 5,156,206 A | 10/1992 | Cox |
| 5,170,011 A | 12/1992 | Martucci |
| 5,172,765 A | 12/1992 | Sas-Jaworsky et al. |
| 5,176,180 A | 1/1993 | Williams et al. |
| 5,182,779 A | 1/1993 | D'Agostino et al. |
| 5,184,682 A | 2/1993 | Delacour et al. |
| 5,188,872 A | 2/1993 | Quigley |
| 5,209,136 A | 5/1993 | Williams |
| 5,222,769 A | 6/1993 | Kaempen |
| 5,261,462 A | 11/1993 | Wolfe et al. |
| 5,265,648 A | 11/1993 | Lyon |
| 5,285,008 A | 2/1994 | Sas-Jaworsky et al. |
| 5,285,204 A | 2/1994 | Sas-Jaworsky |
| 5,330,807 A | 7/1994 | Williams |
| 5,332,269 A | 7/1994 | Homm |
| 5,334,801 A | 8/1994 | Mohn et al. |
| 5,343,738 A | 9/1994 | Skaggs |
| 5,346,658 A | 9/1994 | Gargiulo |
| 5,348,088 A | 9/1994 | Laflin et al. |
| 5,348,096 A | 9/1994 | Williams |
| 5,351,752 A | 10/1994 | Wood et al. |
| RE34,780 E | 11/1994 | Trenconsky et al. |
| 5,364,130 A | 11/1994 | Thalmann |
| 5,373,870 A | 12/1994 | Derroire et al. |
| 5,394,488 A | 2/1995 | Fernald et al. |
| 5,395,913 A | 3/1995 | Bottcher et al. |
| 5,398,729 A | 3/1995 | Spurgat |
| 5,416,724 A | 5/1995 | Savic |
| 5,426,297 A | 6/1995 | Dunphy et al. |
| 5,428,706 A | 6/1995 | Lequeux et al. |
| 5,435,867 A | 7/1995 | Wolfe et al. |
| 5,437,311 A | 8/1995 | Reynolds |
| 5,437,899 A | 8/1995 | Quigley |
| 5,443,099 A | 8/1995 | Chaussepied et al. |
| 5,452,923 A | 9/1995 | Smith |
| 5,457,899 A | 10/1995 | Chemello |
| 5,460,416 A | 10/1995 | Freidrich et al. |
| RE35,081 E | 11/1995 | Quigley |
| 5,469,916 A | 11/1995 | Sas-Jaworsky et al. |
| 5,472,764 A | 12/1995 | Kehr et al. |
| 5,494,374 A | 2/1996 | Youngs et al. |
| 5,499,661 A | 3/1996 | Odru et al. |
| 5,524,937 A | 6/1996 | Sides, III et al. |
| 5,525,698 A | 6/1996 | Bottcher et al. |
| 5,538,513 A | 7/1996 | Okajima et al. |
| 5,551,484 A | 9/1996 | Charboneau |
| 5,558,375 A | 9/1996 | Newman |
| 5,622,211 A | 4/1997 | Martin et al. |
| 5,641,956 A | 6/1997 | Vengsarkar et al. |
| 5,671,811 A | 9/1997 | Head et al. |
| 5,683,204 A | 11/1997 | Lawther et al. |
| 5,692,545 A | 12/1997 | Rodrigue |
| 5,718,956 A | 2/1998 | Gladfelter et al. |
| 5,730,188 A | 3/1998 | Kalman et al. |
| 5,755,266 A | 5/1998 | Aanonsen et al. |
| 5,758,990 A | 6/1998 | Davies et al. |
| 5,778,938 A | 7/1998 | Chick et al. |
| 5,785,091 A | 7/1998 | Barker, II |
| 5,795,102 A | 8/1998 | Corbishley et al. |
| 5,797,702 A | 8/1998 | Drost et al. |
| 5,798,155 A | 8/1998 | Yanagawa et al. |
| 5,804,268 A | 9/1998 | Mukawa et al. |
| 5,826,623 A | 10/1998 | Akiyoshi et al. |
| 5,828,003 A | 10/1998 | Thomeer et al. |
| 5,865,216 A | 2/1999 | Youngs |
| 5,875,792 A | 3/1999 | Campbell, Jr. et al. |
| 5,908,049 A | 6/1999 | Williams et al. |
| 5,913,337 A | 6/1999 | Williams et al. |
| 5,913,357 A | 6/1999 | Hanazaki et al. |
| 5,921,285 A | 7/1999 | Quigley et al. |
| 5,933,945 A | 8/1999 | Thomeer et al. |
| 5,950,651 A | 9/1999 | Kenworthy et al. |
| 5,951,812 A | 9/1999 | Gilchrist, Jr. |
| 5,979,506 A | 11/1999 | Aarseth |
| 5,984,581 A | 11/1999 | McGill et al. |
| 5,988,702 A | 11/1999 | Sas-Jaworsky |
| 6,004,639 A * | 12/1999 | Quigley et al. .............. 428/36.3 |
| 6,016,845 A | 1/2000 | Quigley et al. |
| 6,032,699 A | 3/2000 | Cochran et al. |
| 6,065,540 A | 5/2000 | Thomeer et al. |
| 6,066,377 A | 5/2000 | Tonyali et al. |
| 6,076,561 A | 6/2000 | Akedo et al. |
| 6,093,752 A | 7/2000 | Park et al. |
| 6,109,306 A | 8/2000 | Kleinert |
| 6,123,110 A | 9/2000 | Smith et al. |
| 6,136,216 A | 10/2000 | Fidler et al. |
| 6,148,866 A | 11/2000 | Quigley et al. |
| RE37,109 E | 3/2001 | Ganelin |
| 6,209,587 B1 | 4/2001 | Hsich et al. |
| 6,220,079 B1 | 4/2001 | Taylor et al. |
| 6,286,558 B1 | 9/2001 | Quigley et al. |
| 6,315,002 B1 | 11/2001 | Antal et al. |
| 6,328,075 B1 | 12/2001 | Furuta et al. |
| 6,334,466 B1 | 1/2002 | Jani et al. |
| 6,357,485 B2 | 3/2002 | Quigley et al. |
| 6,357,966 B1 | 3/2002 | Thompson et al. |
| 6,361,299 B1 | 3/2002 | Quigley et al. |
| 6,372,861 B1 | 4/2002 | Schillgalies et al. |
| 6,390,140 B2 | 5/2002 | Niki et al. |
| 6,402,430 B1 | 6/2002 | Guesnon et al. |
| 6,422,269 B1 | 7/2002 | Johansson et al. |
| 6,461,079 B1 | 10/2002 | Beaujean et al. |
| 6,470,915 B1 | 10/2002 | Enders et al. |
| 6,532,994 B1 | 3/2003 | Enders et al. |
| 6,538,198 B1 | 3/2003 | Wooters |
| 6,557,485 B1 | 5/2003 | Sauter |
| 6,557,905 B2 | 5/2003 | Mack et al. |
| 6,604,550 B2 | 8/2003 | Quigley et al. |
| 6,620,475 B1 | 9/2003 | Reynolds, Jr. et al. |
| 6,631,743 B2 | 10/2003 | Enders et al. |
| 6,634,387 B1 | 10/2003 | Glejbøl et al. |
| 6,634,388 B1 | 10/2003 | Taylor et al. |
| 6,634,675 B2 | 10/2003 | Parkes |
| 6,663,453 B2 | 12/2003 | Quigley et al. |
| 6,691,781 B2 | 2/2004 | Grant et al. |
| 6,706,348 B2 | 3/2004 | Quigley et al. |
| 6,706,398 B1 | 3/2004 | Revis |
| 6,746,737 B2 | 6/2004 | Debalme et al. |
| 6,764,365 B2 | 7/2004 | Quigley et al. |
| 6,787,207 B2 | 9/2004 | Lindstrom et al. |
| 6,803,082 B2 | 10/2004 | Nichols et al. |
| 6,807,988 B2 | 10/2004 | Powell et al. |
| 6,807,989 B2 | 10/2004 | Enders et al. |
| 6,857,452 B2 | 2/2005 | Quigley et al. |
| 6,889,716 B2 | 5/2005 | Lundberg et al. |
| 6,902,205 B2 | 6/2005 | Bouey et al. |
| 6,978,804 B2 | 12/2005 | Quigley et al. |
| 6,983,766 B2 | 1/2006 | Baron et al. |
| 7,000,644 B2 | 2/2006 | Ichimura et al. |
| 7,021,339 B2 | 4/2006 | Hagiwara et al. |
| 7,025,580 B2 | 4/2006 | Heagy et al. |
| 7,029,356 B2 | 4/2006 | Quigley et al. |
| 7,069,956 B1 | 7/2006 | Mosier |
| 7,080,667 B2 | 7/2006 | McIntyre et al. |
| 7,152,632 B2 | 12/2006 | Quigley et al. |
| 7,234,410 B2 | 6/2007 | Quigley et al. |
| 7,243,716 B2 | 7/2007 | Denniel et al. |
| 7,285,333 B2 | 10/2007 | Wideman et al. |
| 7,306,006 B1 | 12/2007 | Cornell |
| 7,328,725 B2 | 2/2008 | Henry et al. |
| 7,498,509 B2 | 3/2009 | Brotzell et al. |
| 7,523,765 B2 | 4/2009 | Quigley et al. |
| 7,600,537 B2 | 10/2009 | Bhatnagar et al. |

(56) References Cited

U.S. PATENT DOCUMENTS

| | | | |
|---|---|---|---|
| 7,647,948 | B2 | 1/2010 | Quigley et al. |
| 2001/0006712 | A1 | 7/2001 | Hibino et al. |
| 2001/0013669 | A1 | 8/2001 | Cundiff et al. |
| 2001/0025664 | A1* | 10/2001 | Quigley et al. ............... 138/125 |
| 2002/0008101 | A1* | 1/2002 | Hauschulz ................... 219/494 |
| 2002/0040910 | A1* | 4/2002 | Pahl ............................ 220/709 |
| 2002/0081083 | A1 | 6/2002 | Griffioen et al. |
| 2002/0094400 | A1 | 7/2002 | Lindstrom et al. |
| 2002/0119271 | A1 | 8/2002 | Quigley et al. |
| 2002/0185188 | A1 | 12/2002 | Quigley et al. |
| 2003/0008577 | A1* | 1/2003 | Quigley et al. ............... 441/133 |
| 2003/0087052 | A1 | 5/2003 | Wideman et al. |
| 2004/0014440 | A1 | 1/2004 | Makela et al. |
| 2004/0025951 | A1 | 2/2004 | Baron et al. |
| 2004/0052997 | A1 | 3/2004 | Santo |
| 2004/0074551 | A1 | 4/2004 | McIntyre |
| 2004/0094299 | A1 | 5/2004 | Jones |
| 2004/0096614 | A1 | 5/2004 | Quigley et al. |
| 2004/0134662 | A1 | 7/2004 | Chitwood et al. |
| 2004/0226719 | A1 | 11/2004 | Morgan et al. |
| 2004/0265524 | A1 | 12/2004 | Wideman et al. |
| 2005/0087336 | A1 | 4/2005 | Surjaatmadja et al. |
| 2005/0189029 | A1 | 9/2005 | Quigley et al. |
| 2006/0000515 | A1 | 1/2006 | Huffman |
| 2006/0249508 | A1 | 11/2006 | Teufl et al. |
| 2007/0040910 | A1 | 2/2007 | Kuwata |
| 2007/0125439 | A1 | 6/2007 | Quigley et al. |
| 2007/0154269 | A1 | 7/2007 | Quigley et al. |
| 2007/0187103 | A1 | 8/2007 | Crichlow |
| 2007/0246459 | A1* | 10/2007 | Loveless et al. ............... 219/643 |
| 2008/0006337 | A1 | 1/2008 | Quigley et al. |
| 2008/0006338 | A1 | 1/2008 | Wideman et al. |
| 2008/0014812 | A1 | 1/2008 | Quigley et al. |
| 2008/0164036 | A1 | 7/2008 | Bullen |
| 2008/0185042 | A1 | 8/2008 | Feechan et al. |
| 2008/0210329 | A1 | 9/2008 | Quigley et al. |
| 2009/0090460 | A1 | 4/2009 | Wideman et al. |
| 2009/0107558 | A1 | 4/2009 | Quigley et al. |
| 2009/0173406 | A1 | 7/2009 | Quigley et al. |
| 2009/0194293 | A1 | 8/2009 | Stephenson et al. |
| 2009/0278348 | A1 | 11/2009 | Brotzell et al. |
| 2010/0101676 | A1 | 4/2010 | Quigley et al. |
| 2010/0212769 | A1 | 8/2010 | Quigley et al. |
| 2010/0218944 | A1 | 9/2010 | Quigley et al. |
| 2011/0013669 | A1 | 1/2011 | Raj et al. |

FOREIGN PATENT DOCUMENTS

| | | | |
|---|---|---|---|
| DE | 1959738 | | 6/1971 |
| DE | 3603597 | | 8/1987 |
| DE | 4040400 | A1 | 8/1992 |
| DE | 4214383 | C1 | 9/1993 |
| DE | 19905448 | A1 | 8/2000 |
| EP | 0024512 | | 3/1981 |
| EP | 0203887 | A2 | 12/1986 |
| EP | 352148 | | 1/1990 |
| EP | 0427306 | A2 | 5/1991 |
| EP | 0477704 | A1 | 4/1992 |
| EP | 0503737 | A1 | 9/1992 |
| EP | 505815 | A2 | 9/1992 |
| EP | 0536844 | A1 | 4/1993 |
| EP | 0681085 | A2 | 11/1995 |
| EP | 0854029 | A2 | 7/1998 |
| EP | 0953724 | A2 | 11/1999 |
| EP | 0970980 | | 1/2000 |
| EP | 0981992 | A1 | 3/2000 |
| FR | 989204 | | 9/1951 |
| GB | 553110 | | 5/1943 |
| GB | 809097 | | 2/1959 |
| GB | 909187 | | 10/1962 |
| GB | 956500 | | 4/1964 |
| GB | 1297250 | | 11/1972 |
| GB | 2103744 | A | 2/1983 |
| GB | 2159901 | A | 12/1985 |
| GB | 2193006 | A | 1/1988 |
| GB | 2255994 | A | 11/1992 |
| GB | 2270099 | A | 3/1994 |
| GB | 2365096 | | 2/2002 |
| JP | 163 592 | | 6/1990 |
| WO | WO-87/04768 | | 8/1987 |
| WO | WO-91/13925 | | 9/1991 |
| WO | WO-92/21908 | | 12/1992 |
| WO | WO-9319927 | | 1/1993 |
| WO | WO-9307073 | A1 | 4/1993 |
| WO | WO-95/02782 | A1 | 1/1995 |
| WO | WO-97/12115 | A2 | 4/1997 |
| WO | WO-9712166 | A1 | 4/1997 |
| WO | WO-99/19653 | A1 | 4/1999 |
| WO | WO-0031458 | A1 | 6/2000 |
| WO | WO-0073695 | A1 | 12/2000 |
| WO | WO-2006003208 | A1 | 1/2006 |

OTHER PUBLICATIONS

International Search Report mailed on Mar. 5, 2001.

International Search Report mailed on Nov. 8, 2005.

Austigard E. and R. Tomter ; "Composites Subsea: Cost Effective Products; an Industry Challenge", Subsea 94 International Conference, the 1994 Report on Subsea Engineering: The Continuing Challenges.

Connell Mike et al.; "Coiled Tubing: Application for Today's Challenges", Petroleum Engineer International, pp. 18-21 (Jul. 1999).

Feechan Mike et al.; "Spoolable Composites Show Promise", The American Oil & Gas Reporter, pp. 44-50 (Sep. 1999).

Fowler Hampton et al.; "Development Update and Applications of an Advanced Composite Spoolable Tubing", Offshore Technology Conference held in Houston Texas from May 4-7, 1998, pp. 157-162.

Fowler Hampton; "Advanced Composite Tubing Usable", The American Oil & Gas Reporter, pp. 76-81 (Sep. 1997).

Hahn H. Thomas and Williams G. Jerry; "Compression Failure Mechanisms in Unidirectional Composites". NASA Technical Memorandum pp. 1-42 (Aug. 1984).

Hansen et al.; "Qualification and Verification of Spoolable High Pressure Composite Service Lines for the Asgard Field Development Project", paper presented at the 1997 Offshore Technology Conference held in Houston Texas from May 5-8, 1997, pp. 45-54.

Hartman, D.R., et al., "High Strength Glass Fibers," Owens Corning Technical Paper (Jul. 1996).

Haug et al.; "Dynamic Umbilical with Composite Tube (DUCT)", Paper presented at the 1998 Offshore Technology Conference held in Houston Texas from 4th to 7th, 1998; pp. 699-712.

Lundberg et al.; "Spin-off Technologies from Development of Continuous Composite Tubing Manufacturing Process", Paper presented at the 1998 Offshore Technology Conference held in Houston, Texas from May 4-7, 1998 pp. 149-155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from Apr. 5-6, 2000, pp. 1-9.

Measures et al.; "Fiber Optic Sensors for Smart Structures", Optics and Lasers Engineering 16: 127-152 (1992).

Measures R. M.; "Smart Structures with Nerves of Glass". Prog. Aerospace Sci. 26(4): 289-351 (1989).

Moe Wood T. et al.; "Spoolable, Composite Piping for Chemical and Water Injection and Hydraulic Valve Operation", Proceedings of the 11th International Conference on Offshore Mechanics and Arctic Engineering-I992-, vol. III, Part A—Materials Engineering, pp. 199-207 (1992).

Poper Peter; "Braiding", International Encyclopedia of Composites, Published by VGH, Publishers, Inc., 220 East 23rd Street, Suite 909, New York, NY 10010.

Quigley et al.; "Development and Application of a Novel Coiled Tubing String for Concentric Workover Services", Paper presented at the 1997 Offshore Technology Conference held in Houston, Texas from May 5-8, 1997, pp. 189-202.

Rispler K. et al.; "Composite Coiled Tubing in Harsh Completion/Workover Environments", Paper presented at the SPE GAS Technology Symposium and Exhibition held in Calgary, Alberta, Canada, on Mar. 15-18, 1998, pp. 405-410.

(56) References Cited

OTHER PUBLICATIONS

Sas-Jaworsky II Alex.; "Developments Position CT for Future Prominence", The American Oil & Gas Reporter, pp. 87-92 (Mar. 1996).

Sas-Jaworsky II and Bell Steve "Innovative Applications Stimulate Coiled Tubing Development", World Oil, 217(6): 61 (Jun. 1996).

Sas-Jaworsky II and Mark Elliot Teel; "Coiled Tubing 1995 Update: Production Applications", World Oil, 216 (6): 97 (Jun. 1995 ).

Sas-Jaworsky, A. and J.G. Williams, "Advanced composites enhance coiled tubing capabilities", World Oil, pp. 57-69 (Apr. 1994).

Sas-Jaworsky, A. and J.G. Williams, "Development of a composite coiled tubing for oilfield services", Society of Petroleum Engineers, SPE 26536, pp. 1-11 (1993).

Sas-Jaworsky, A. and J.G. Williams, "Enabling capabilities and potential applications of composite coiled tubing", Proceedings of World Oil's 2nd International Conference on Coiled Tubing Technology, pp. 2-9 (1994).

Shuart J. M. et al.; "Compression Behavior of ≠45o-Dominated Laminates with a Circular Hole or Impact Damage", AIAA Journal 24(1):115-122 (Jan. 1986).

Silverman A. Seth; "Spoolable Composite Pipe for Offshore Applications", Materials Selection & Design pp. 48-50 (Jan. 1997).

Williams G. J. et al.; "Composite Spoolable Pipe Development, Advancements, and Limitations", Paper presented at the 2000 Offshore Technology Conference held in Houston Texas from May 1-4, 2000, pp. 1-16.

Williams, J.G., "Oil Industry Experiences with Fiberglass Components," Offshore Technology Conference, 1987, pp. 211-220.

International Search Report and Written Opinion for PCT/US2010/060582 mailed on Feb. 16, 2011 (11 pages).

Sperling, L.H., "Introduction to Physical Polymer Science 3rd Edition," Wiley-Interscience, New York, NY, 2001, p. 100.

Fiberspar Tech Notes, "Horizontal well deliquification just got easier-with Fiberspar Spoolable Production Systems," TN21-R1UN1-HybridLift, 2010, 2 pages.

Dalmolen "The Properties, Qualification, and System Design of, and Field Experiences with Reinforced Thermoplastic Pipe for Oil and Gas Applications" NACE International, 2003 West Conference (Feb. 2003), 11 pages.

Mesch, K.A., "Heat Stabilizers," Kirk-Othmer Encyclopedia of Chemical Technology, 2000, pp. 1-20.

\* cited by examiner

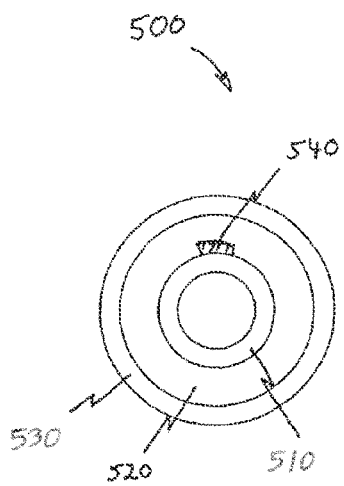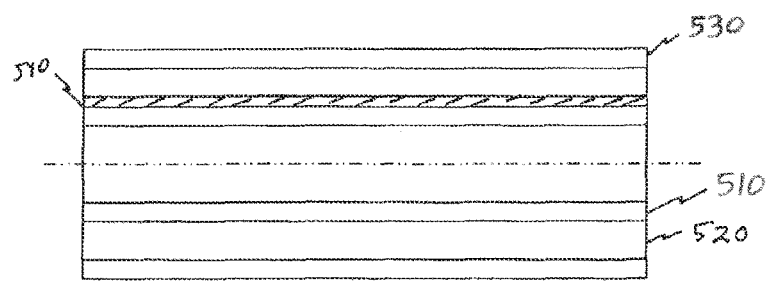
FIG. 5A FIG. 5B
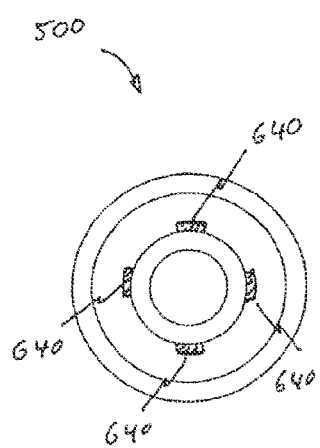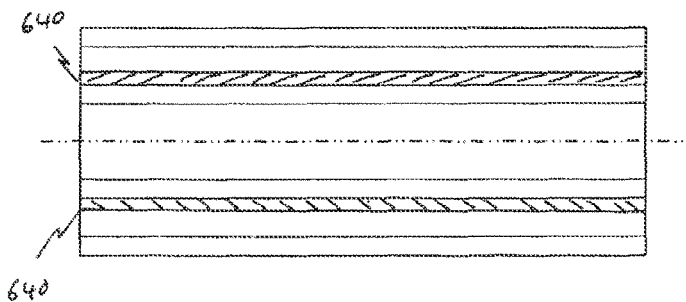
FIG. 6A FIG. 6B

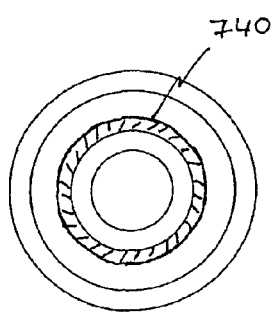 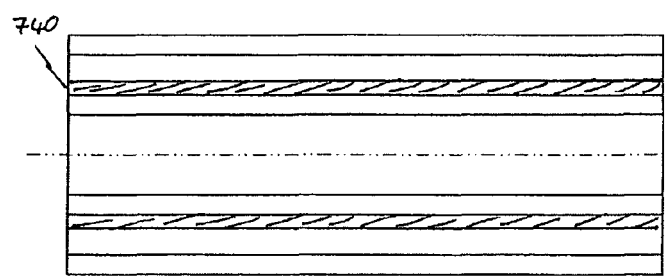
FIG. 7A         FIG. 7B
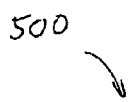
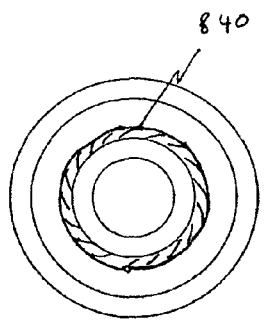 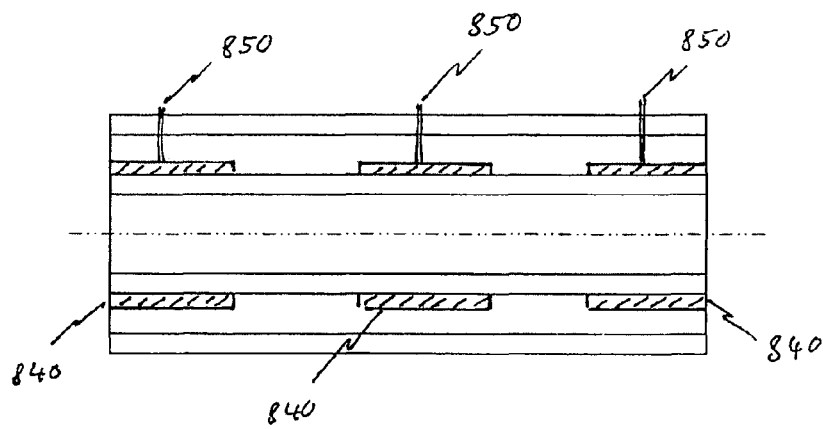
FIG. 8A         FIG. 8B

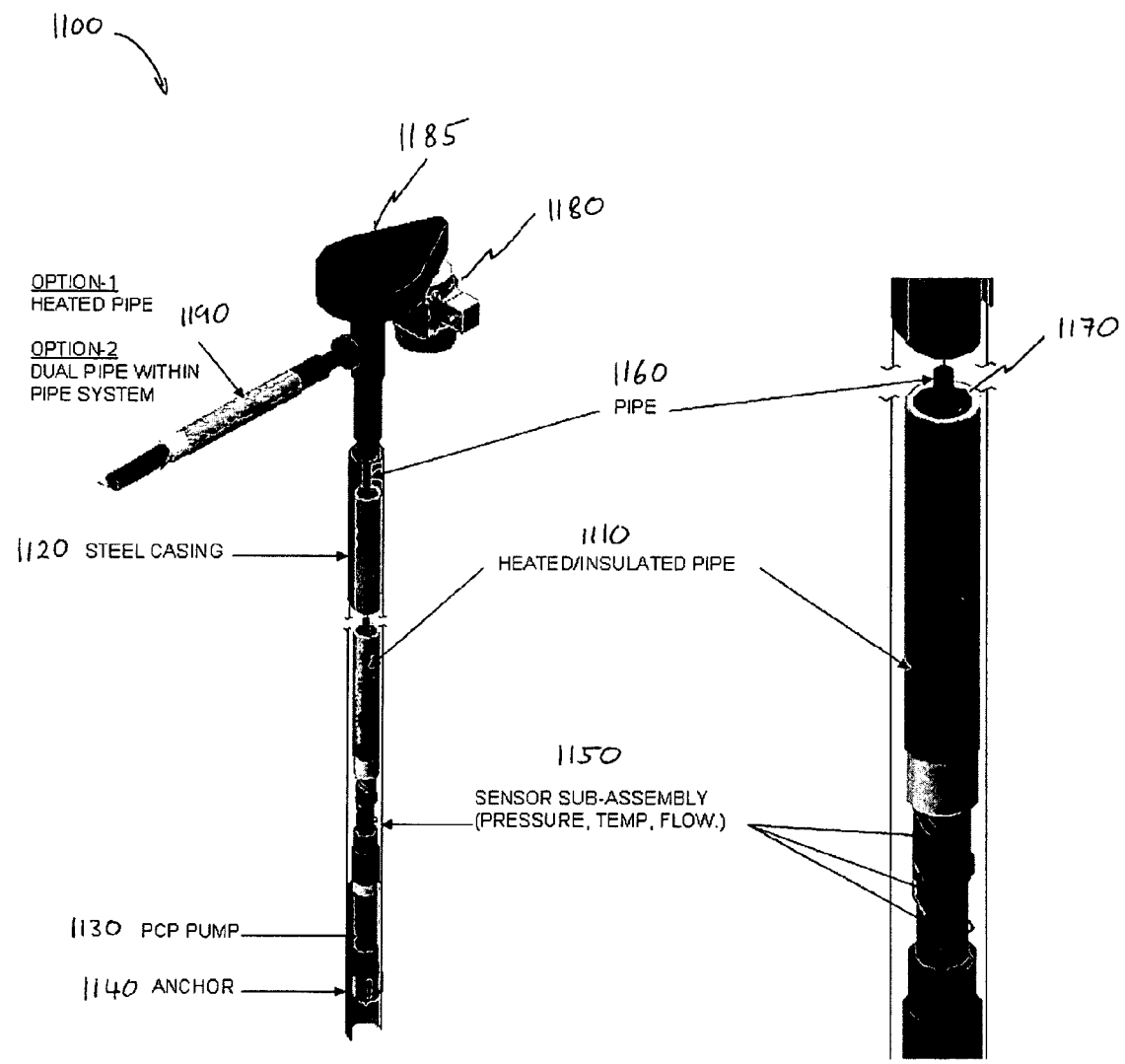
FIG.11A                    FIG. 11B

HEATED PIPE AND METHODS OF TRANSPORTING VISCOUS FLUID

RELATED APPLICATIONS

This application claims priority to and the benefit of U.S. Ser. No. 60/981,858 filed Oct. 23, 2007, which is hereby incorporated by reference in its entirety.

FIELD OF THE INVENTION

The present invention relates generally to the field of fluid transport, and more particularly to methods and devices for maintaining and transporting viscous fluids at elevated temperatures.

BACKGROUND OF THE INVENTION

The efficient transport of multi-phase fluids may be a significant problem in the production of viscous fluids, such as heavy crude oil commonly produced in Western Canada. These fluids are often highly viscous at ambient temperature, making them difficult to transport through conventional pipeline systems.

As a result, fluids such as heavy crude oil that are too viscous to transport by conventional pipeline must currently be placed in tanks, then heated to separate the oil, water, gas, and sediment, before being transported by truck. This results in an expensive, complicated, and highly inefficient system for transporting the oil.

As a result, there is a need for a more efficient means of transporting viscous fluid flows over extended distances that minimizes the storage, processing, and transporting costs.

SUMMARY OF THE INVENTION

One aspect of the invention includes a fiber reinforced spoolable pipe for transporting a fluid at elevated temperature. The spoolable pipe may include an inner layer, at least one reinforcing layer, at least one heating element external to the inner layer, and at least one insulation layer.

In one embodiment, the inner layer may include a polymeric material, a thermoplastic material, a thermoset material, a composite material, a metallic material, or combinations thereof. The thermoplastic may be a high density polyethylene (HDPE), a cross-linked polyethylene (PEX), a polyvinylidene fluoride (PVDF), nylon, or combinations thereof. In one embodiment, the reinforcing layer may include at least one first layer of helical reinforcing fiber. The at least one first layer of helical reinforcing fiber may be applied at a helical angle of about 30° to about 70°. The reinforcing layer may also include at least one second helically extending fiber.

In one embodiment, the at least one first layer of helical reinforcing fiber may be embedded within a polymeric matrix. The polymeric matrix may include a thermoset epoxy. The at least one reinforcing layer may include a glass, a carbon, an aramid, a metallic strand, a wire, a tape, a polymeric material, and combinations thereof.

In one embodiment, one or more insulation layers may include at least one of an external structural insulation and a non-structural insulation. The spoolable pipe may also include an external protection layer. The external insulation may include a polymeric foam, a gel, a composite material, a fiberglass material, or combinations thereof.

In one embodiment, the external insulation, and/or the external protection layer, may include an extruded material, a cast material, a wrapped material, a molded material, a foam material, and combinations thereof. The external protection layer may include a polymeric material, a metallic material, a composite material, a foam material, or combinations thereof.

In one embodiment, the non-structural insulation may include expanded polymers. The non-structural insulation may be located between the at least one reinforcing layer and the external protection layer. The inner layer may be substantially impervious to fluid.

In one embodiment, the at least one heating element may include an inductive heating element, a radiative heating element, a heat tape, a heat band, an electrical wire, and combinations thereof. The at least one heating element may be adapted to at least one of modify, measure, or control a temperature of a fluid being transported within the spoolable pipe. The at least one heating element may include a variable heating element. The variable heating element may be adapted to provide variable heating along at least a portion of the length of the spoolable pipe.

In one embodiment, the at least one heating element may include a plurality of discrete heating elements. The plurality of discrete heating elements may be adapted to connect to an external power source. Each of the plurality of discrete heating elements may connect to multiple external power sources.

One embodiment of the invention may further include at least one control element. At least one control element may be connected to the external power source. The spoolable pipe may be adapted for operation below ground. In one embodiment, the spoolable pipe may include at least one electrical conductor extending lengthwise along the spoolable pipe and embedded within a wall of the spoolable pipe. At least one sensor may be integrally formed with the electrical conductor.

The electrical conductor may be adapted to provide power to the sensor and/or provide a means of remotely communicating with the sensor. At least one sensor may include a light sensor, a temperature sensor, a flow rate sensor, a viscosity sensor, a chemical sensor, a pressure sensor, a mechanical sensor, an electrical sensor, an optical sensor, and a power sensor.

One embodiment may include at least one optical fiber extending lengthwise along the spoolable pipe and embedded within a wall of the spoolable pipe. At least one optical sensor may be integrally formed with the optical fiber. The optical sensor may be connected to the optical fiber for signal communication. The optical sensor may respond to an ambient condition of the spoolable pipe and communicate a signal responsive thereto along the optical fiber. An optical sensor may include an interferometric sensor, an optical intensity sensor, a light scattering sensor, a spectral transmission sensor, a radiative loss sensor, a reflectance sensor, and a modal change sensor.

One aspect of the invention includes a method of transporting a fluid at an elevated temperature. The method may include providing a fiber reinforced spoolable pipe including an inner layer, at least one reinforcing layer, at least one heating element, external to the inner layer, and at least one insulation layer. The method also includes the steps of providing a means of powering the heating element and powering the heating element to produce an elevated temperature within the spoolable pipe.

Another aspect of the invention includes a method of heating a fluid being transported within a fiber reinforced spoolable pipe. The method may include providing a spoolable pipe including an inner layer, at least one reinforcing layer, and at least one insulation layer. The method also includes the steps of positioning at least one heating element within the spoolable pipe and providing power to the at least one heating element to heat the fluid.

Another aspect of the invention includes a method of transporting a fluid at an elevated temperature. The method may include providing a fiber reinforced spoolable pipe including an inner layer, at least one reinforcing layer, and at least one insulation layer. The method also includes the steps of providing a means of heating a fluid being transported within the spoolable pipe to an elevated temperature, monitoring a condition at a location along a length of the spoolable pipe, and providing power to the heating means in response to a monitored condition reading. In one embodiment, the condition may include at least one of a temperature, a pressure, and a flow rate.

Another aspect of the invention includes a method of deploying a spoolable pipe for transporting a fluid at elevated temperature. The method may include providing a pipe deployment system adapted to move a first spoolable pipe within a second pipe, wherein the first spoolable pipe is adapted to transport a fluid at elevated temperature, and wherein an inner diameter of the second pipe is greater than the outer diameter of the first spoolable pipe. The method may also include the steps of deploying the second pipe and inserting the first spoolable pipe into the second pipe through an access location with the pipe deployment system.

In one embodiment, the second pipe may include at least one of an inner layer, an insulation layer, and a wear resistant layer. An inner diameter of the second pipe may be greater than the outer diameter of the first spoolable pipe. An annulus between the first spoolable pipe and the second pipe may be adapted to transport a heated fluid.

One aspect of the invention includes a method of rehabilitating a spoolable pipe for transporting a fluid at elevated temperature. The method may include providing a pipe deployment system adapted to move a first spoolable pipe within a second pipe, wherein the first spoolable pipe is adapted to transport a fluid at elevated temperature, and wherein an inner diameter of the second pipe is greater than the outer diameter of the first spoolable pipe. The method may also include the steps of removing at least a portion of the first spoolable pipe from the second pipe through an access location with the pipe deployment system, performing at least one maintenance task on the first spoolable pipe, and redeploying the first spoolable pipe within the second pipe with the pipe deployment system.

In one embodiment, the first spoolable pipe may be inserted into the second pipe after deploying the second pipe. The first spoolable pipe may be inserted into the second pipe prior to deploying the second pipe. The deploying step may include laying the second pipe along the ground and/or burying the second pipe below ground. The burying step may include at least one of ditching, plowing, or drilling.

In one embodiment, the second pipe may be adapted to provide external protection to the first pipe when deployed. The first spoolable pipe may further include a heating element, an optical fiber, an optical sensor, a measurement device, a control device, and/or a structural reinforcing element. An annulus between the first spoolable pipe and the second pipe may greater than or equal to about 0.1 inches. In one embodiment, the pipe deployment system may include a winch, a pulling device, a pushing device, a propulsion jet, a wireline, an injector apparatus, or a spooling apparatus.

Another aspect of the invention may include a system for transporting a fluid at an elevated temperature. The system may include a first fiber reinforced spoolable pipe, a drive assembly adapted to provide a torque to the first spoolable pipe, and a pump assembly. The system may further include a second spoolable pipe positioned concentrically around the first spoolable pipe, wherein an inner diameter of the second pipe is greater than the outer diameter of the first spoolable pipe, and wherein an annulus between the first spoolable pipe and the second pipe is adapted to transport a fluid. The system may further include a fitting connecting the annulus to a third, substantially horizontally disposed, spoolable pipe.

In one embodiment, at least one of the first spoolable pipe, the second spoolable pie, and the third spoolable pipe is adapted to transport a fluid at an elevated temperature. The annulus may be adapted to lift a fluid from a subterranean location to a surface location. The second pipe may include at least one of an external protection layer, an external insulation layer, and a wear layer.

In one embodiment, the first spoolable pipe may include a rotating spoolable fiber reinforced composite pipe. In one embodiment, the drive assembly is positioned above ground. In one embodiment, the pump assembly is a sub-surface progressive cavity pump. At least one of the first spoolable pipe, the second spoolable pipe, and the third spoolable pipe may further include at least one of a heating element, an optical fiber, an optical sensor, a measurement device, a control device, or a structural reinforcing element. The heating element may be adapted to heat a fluid being transported within at least one of the first spoolable pipe, the second spoolable pipe, and the third spoolable pipe above its ambient sub-surface temperature.

An instrument sub-assembly may be located above the pump. The instrument sub-assembly may be adapted to monitor a system property. The system property may include a mechanical property, a temperature, a pressure, a viscosity, a flow rate, a vibration, and a chemical property. The instrument sub-assembly may further include a device for communicating information about the system property to a monitoring device.

Another aspect of the invention may include a system for transporting a fluid at an elevated temperature. The system may include a rotatable fiber reinforced spoolable pipe comprising an annulus, a drive assembly adapted to provide rotary power to the spoolable pipe, wherein the annulus is adapted to transport a fluid in response to a rotation of the spoolable pipe, a pump assembly coupled to the spoolable pipe, and a fitting connecting the annulus to a second, substantially horizontally disposed, spoolable pipe.

In one embodiment, the rotatable spoolable pipe may be coupled to the rotating pump assembly at a sub-surface location. At least one of the rotatable spoolable pipe and the second spoolable pipe further may include at least one of a heating element, an optical fiber, an optical sensor, a measurement device, a control device, or a structural reinforcing element.

In one embodiment, the heating element may be adapted to heat a fluid being transported within at least one of the rotatable spoolable pipe and the second spoolable pipe. The heating element may be located within an outer insulation layer of at least one of the rotatable spoolable pipe and the second spoolable pipe. The second spoolable pipe may be adapted to transport a fluid at an elevated temperature. The annulus may be adapted to lift a fluid from a subterranean location to a surface location.

In one embodiment, at least one of the rotatable spoolable pipe and the second spoolable pipe may include at least one of an external protection layer, an external insulation layer, and a wear layer. The rotatable spoolable pipe may be a spoolable fiber reinforced composite pipe. The drive assembly may be positioned above ground. The pump assembly may be a subsurface progressive cavity pump.

In one embodiment, the system may further include an instrument sub-assembly located above the pump. The instrument sub-assembly may be adapted to monitor a system property. The system property may include a temperature, a pressure, a viscosity, a flow rate, a vibration, a chemical property, and a mechanical property. The instrument sub-assembly may further include a device for communicating information about the system property to a monitoring device.

In one embodiment, a fiber reinforced spoolable pipe may include bundles of glass, carbon, aramid, polymer, basalt or metallic materials such as, but not limited to, metal wires. Fiber reinforced spoolable pipe may also include assemblies of composites, such as, those listed above, into tapes, wires, and/or cables.

In addition, multi-phase viscous fluids such as crude oil are often quite abrasive, resulting in the erosion of any pipeline system in which the oil is transported. in one aspect of the invention, adding additional liners to a spoolable pipeline system, such as one or more thermoplastic inner liners, may provide a good erosion barrier as well as providing beneficial thermal properties for the transport of such fluids at elevated temperatures.

These and other objects, along with advantages and features of the present invention, will become apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 5A is a schematic end view of a spoolable pipe with a heating element, in accordance with one embodiment of the invention;

FIG. 5B is a schematic sectional view of the spoolable pipe of FIG. 5A;

FIG. 6A is a schematic end view of a spoolable pipe with a plurality of heating elements, in accordance with one embodiment of the invention;

FIG. 6B is a schematic sectional view of the spoolable pipe of FIG. 6A;

FIG. 7A is a schematic end view of a spoolable pipe with a wrapped heating element, in accordance with one embodiment of the invention;

FIG. 7B is a schematic sectional view of the spoolable pipe of FIG. 7A;

FIG. 8A is a schematic end view of a spoolable pipe with a plurality of discrete wrapped heating elements, in accordance with one embodiment of the invention;

FIG. 8B is a schematic sectional view of the spoolable pipe of FIG. 8A;

FIG. 11A is a schematic perspective view of a system for transporting a fluid including a spoolable pipe, in accordance with one embodiment of the invention; and FIG. 11B is a schematic perspective view of a portion of the spoolable pipe of FIG. 11A.

DETAILED DESCRIPTION OF THE INVENTION

Figure 1:
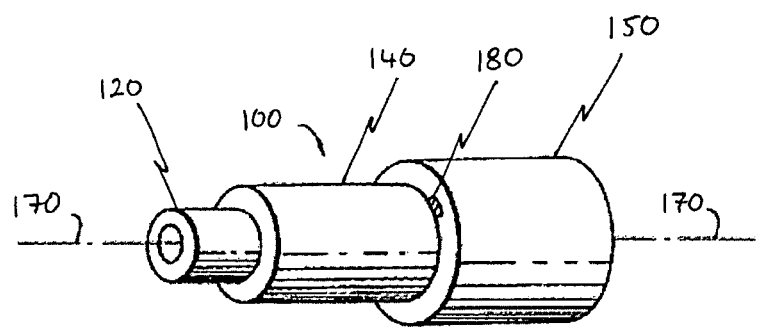
FIG. 1 is a schematic perspective view of a spoolable pipe with a heating element, in accordance with one embodiment of the invention.

One embodiment of the invention includes a novel pipeline system for use in the transport of fluids such as, but not limited to, multi-phase fluids such as oil, water, gas, and particulate. The pipeline system may be particularly effective in transporting fluids that are highly viscous at ambient temperature, but have a lower viscosity at elevated temperatures. Such fluids may be found, for example, in the recovery of heavy crude oil, commonly produced in Western Canada.

In one embodiment of the invention, such fluids may be efficiently transported through the use of a pipeline system designed to raise the temperature of the fluid and/or to maintain the fluid at an elevated temperature. This pipeline system may consist of a spoolable, multi-layer pipe including a means for maintaining the temperature of the fluid flowing inside the annulus of the pipe at a desired temperature. The spoolable multi-layer pipe may also include at least one insulation layer adapted to minimize the heat transfer between the fluid and the surrounding ground or atmosphere. In an alternative embodiment, other appropriate pipes may be used, such as, but not limited to, pipes incorporating dry fiber structures, metallic pipes, fiber impregnated pipes, polymer reinforcement pipes, and combinations thereof.

In one embodiment of the invention, the pipeline system may incorporate a buried section, an on-surface section, and/or an above-surface section. One example embodiment of the invention may include a buried pipeline system, wherein the pipeline is buried below the surface at a depth sufficient to keep the pipe below the frost line. Burying the pipeline at a depth below the frost line may, for example, minimize the temperature difference between the fluid and the material surrounding the pipeline, thus increasing the thermal efficiency of the system.

One embodiment of the invention may include a pipeline system for the transport of heated fluids including a spoolable multi-layer pipe. The spoolable pipe may include a number of layers, including, but not limited to, an inner layer and at least one reinforcing layer having at least one layer of helical reinforcing fibers/strands. The inner layer and reinforcing layer may provide a substantially impermeable fluid transport pipe capable of withstanding the pressures generated by a multi-phase fluid flow. An example spoolable multi-layer pipe including an inner layer and a reinforcing layer is disclosed in U.S. Pat. No. 6,016,845 to Quigley et al., the entire disclosure of which is incorporated herein by reference in its entirety. Other example fiber reinforced spoolable pipes, and components thereof, are disclosed in U.S. patent application Ser. No. 11/689,199 to Wideman et al., U.S. patent application Ser. No. 11/010,827 to Quigley et al., U.S. patent application Ser. No. 10/288,600 to Wideman et al., and U.S. patent application Ser. No. 11/543,300 to Quigley et al., the entire disclosures of which are incorporated herein by reference in their entirety.

One example embodiment of a spoolable pipe is shown in FIG. 1. FIG. 1 illustrates a composite coiled pipe or tube 100 constructed of an inner liner 120, a composite layer 140, and an insulation layer 150. The composite coiled tube is generally formed as a member elongated along axis 170. The coiled tube may have a variety of tubular cross-sectional shapes, including circular, oval, rectangular, square, polygonal and the like. The illustrated tube has a substantially circular cross-section.

Liner 120 serves as a pressure containment member to resist leakage of internal fluids from within the composite coiled tube 100. In one embodiment the liner 120 is metallic, and in an alternative embodiment the liner 120 is formed of polymeric materials having an axial modulus of elasticity exceeding 100,000 psi. A liner with an axial modulus of elasticity less than 500,000 psi advantageously allows the liner to bend, rather than pull away from the composite layer, as the composite tube is spooled or bent around a reel.

The polymeric materials making up the liner 120 may include thermoplastic or thermoset materials. For example, the liner may be formed of homo-polymers, co-polymers, composite polymers, or co-extruded composite polymers. Homo-polymers refer to materials formed from a single polymer, co-polymers refers to materials formed by blending two or more polymers, and composite polymers refer to materials formed of two or more discrete polymer layers that have been permanently bonded or fused. The polymeric materials forming the inner liner are preferably selected from a group of various polymers, including but not limited to: polyvinylidene fluoride, ethylene tetrafluoroethylene, cross-linked polyethylene (PEX), high polyethylene (UHMW, HDPE, MDPE, LDPE), olefins (polypropylene), and polyester. Further exemplary thermoplastic polymers include materials such as polyphenylene sulfide, polyethersulfone, polyethylene terephthalate, polyamide, and acetyl.

Liner 120 may also include fibers to increase the load carrying strength of the liner and the overall load carrying strength of the spoolable composite tube 100. Example composite fibers include graphite, fiberglass, boron, and polyester fibers, and aramid (such as Kevlar™ or Twaron™ brand amarid fibers).

One embodiment of the invention may include a tie layer to enhance bonding between two layers of the spoolable pipe, such as between an inner liner and a reinforcing layer. Example tie-layer materials, articles, and methods for use in a spoolable pipe are disclosed in U.S. Pat. No. 7,285,333 to Wideman et al., the entire disclosure of which is incorporated herein by reference in its entirety.

In one embodiment, two or more of the layers of the fiber reinforced spoolable pipe are integrally bonded such as the inner and reinforcing layers, by chemical or mechanical means. This may assist in preventing a collapse of a section of the pipe if subjected to external pressure, preventing permeating gas to build up volume, or to facilitate installation of connections which provide a pressure seal using the inner surface of the liner as a seal surface. In one embodiment, the inner, reinforcing, and outer layers, such as one or more insulation layers, or some selected parts thereof, may not be bonded together.

The spoolable composite pipe or tube 100, may also include one or more heating elements 180. This heating element may take any or the forms described herein. In one embodiment, the spoolable pipe 100 may also include additional layers, such as, but not limited to, one or more external protection layers.

One embodiment of a spoolable multi-layer pipe (or composite coiled tube) of the present invention may include a composite layer having fibers embedded in a matrix and an inner liner formed from polymeric materials. The fibers in the composite layer may be oriented to resist internal and external pressure and provide low bending stiffness. The composite coiled tube offers the potential to exceed the performance limitations of isotropic metals, thereby increasing the service life of the tube and extending operational parameters. In addition, the fibers, the matrix, and the liner used in the composite coiled tube may make the tube impervious to corrosion and resistant to chemicals used in treatment of oil and gas wells or in flowlines.

In one embodiment, the invention provides for a composite coiled tube having an inner liner formed of polymeric materials and a composite layer enclosing the inner liner.

On embodiment of a spoolable pipe may include one or more reinforcing layers with at least one layer of helical reinforcing. A reinforcing layer for a spoolable pipe may include at least two layers, and in some embodiments as many as 16 or could be more, including helical fiber reinforcing in a +− helical orientation. For example, one sub layer of the reinforcing layer may include fibers oriented at say +50° to the longitudinal axis, and a second sub-layer of the reinforcing layer may be oriented at a −50° helical orientation. In some embodiments, the reinforcing layers may have different wind angles for different layers.

The composite layer may be constructed with a matrix material having a tensile modulus of at least 100,000 psi, a maximum tensile elongation of at least 5%, and a glass transition temperature of at least 180 Degrees Fahrenheit. Increased tube strength may also be obtained by forming a layer having at least 80%, by fiber volume, of the fibers helically oriented relative to the longitudinal axis of the tube at an angle between 30° and 70°.

In one embodiment of the invention, the composite tube may include a liner that serves as a pressure containment member to resist leakage of internal fluids from within the tubing. The inner liner may be formed of co-extruded composite polymers. The polymers forming the liner may also include homo-polymers or co-polymers. The polymeric material forming the liner may be impermeable to fluids (i.e. gasses and liquids). The inner liner may also include materials that are chemically resistive to corrosives.

The liner may be constructed to have improved mechanical properties that enhance the bending characteristics, the strength characteristics, and the pressure characteristics of the coiled composite tube. For example, the liner may have a mechanical elongation of at least 25%, and a melt temperature of at least 250 Degrees Fahrenheit. The liner may also enhance the pressure characteristics of the composite tube by increasing the bonding strength between the inner liner and the composite layer. This may be accomplished by having an inner liner which includes a chemically reactive tie layer, such as adhesive, glue, or other suitable material, which is used to bond the liner to the reinforcing layer. In one embodiment, the composite tube may include a liner capable of dissipating static charge buildup. A liner having an additive of carbon black may prevent static charge buildup. By preventing static charge buildup, the liner is more likely to prevent the ignition of flammable fluid circulating within the tube.

One embodiment of the invention may include a plurality of liners. The plurality of liners may include, for example, an interface liner, and a separate liner including one or more layers, including, for example, an outer layer of the liner which facilitates bonding to a reinforcing layer.

One embodiment of the invention may include an inner layer, a reinforcing layer, and one or more external insulation layers. The external insulation layer may, for example, provide thermal insulation to the pipe and any fluids being carried therein, thereby assisting in maintaining the fluid at an elevated temperature. In one embodiment, an external wear resistant layer, or protection layer, may also be included external to the insulation layer.

One embodiment of the invention may include a separate interface layer interposed between the liner and the composite layer. This interface layer may allow the composite coiled tube to withstand extreme pressures inside and outside the tube without causing degradation of the composite tube. The interface layer may, in one embodiment, bond the composite layer to the liner. In addition, the interface layer may serve as a transition layer between the composite layer and the liner. For example, the interface layer may have a modulus of elasticity between the axial modulus of elasticity of the liner and the axial modulus of elasticity of the composite layer, thereby providing a smooth transition in the modulus of elasticity between the liner and the composite layer.

On embodiment of the invention may include a composite coiled tube having a pressure barrier layer. The pressure barrier layer may be located external to the composite layer for preventing fluids (i.e. gases or liquids) from penetrating into the composite tube. The pressure barrier layer also prevents external pressure from being directly applied to the outer surface of the inner liner, thereby preventing exterior pressure from collapsing the inner liner. The pressure barrier layer may be formed of an impermeable material such as a polymeric film (including polyester), a thermoplastic, a thermoset film, an elastomer or a metallic film. The impermeable material may be helically or circumferentially wrapped around the composite layer, or extruded directly onto the external surface of the composite layer. In addition, the pressure barrier layer may include a fused particle coating. Preferably, the pressure barrier layer has a minimal tensile elongation of 10% and an axial modulus of elasticity of less than 750,000 psi, to aid in the enhanced bending and pressure characteristics of the composite coiled tube.

On embodiment of the invention may include a composite tube having an outer protective layer external to the composite layer. The outer protective layer may provide an outer protective surface and an outer wear resistant surface. The outer protective layer may also resist impacts and abrasion. In those aspects of the invention having both a pressure barrier layer and an outer protective layer, the pressure barrier layer is typically sandwiched between the composite layer and the outer protective layer.

On embodiment of the invention may include one or more energy or data conductors including, for example, electrical wiring or fiber optics. These may, in one embodiment, be formed as an integral part of the spoolable composite tube. Energy conductors commonly have low strain capability and thus may be damaged easily by large deformations such as those imposed by bending. In one embodiment, these energy conductors may be oriented in a helical direction relative to the longitudinal axis of the tube. This orientation minimizes the strain on the energy conductor when the tube bends. In another embodiment, energy conductors may be embedded in an axial or helical orientation directly into the polymeric liner.

Various embodiments of the invention exist which include one or more aspects and features of the invention described above. In one embodiment, the spoolable composite tube includes an inner liner and an outer composite layer. In one embodiment the tube may be designed to include or exclude an interface layer sandwiched between the inner liner and the composite layer. The interface layer increases the bonding strength between the liner and the composite layer. Other embodiments provide for a composite tube including a liner, a composite layer, and a pressure barrier. Further embodiments include a liner, a composite layer, a pressure barrier, and an external protective layer. While in an additional embodiment, the composite tube might include only a liner, a composite layer, and a pressure barrier. The invention also contemplates a spoolable tube having a liner, an inner composite layer, a pressure barrier, and an outer composite layer surrounding the pressure barrier.

One embodiment of the composite tube described in this invention cannot only carry high internal pressure but may also carry high compressive, tension and torsion loads, independently or in combination. Such capability is essential if the tubing is to be used for applications such as coiled tubing in which the tubing is pushed into a high pressure reservoir and to overcome the friction to movement within the well bore, especially for highly deviated or horizontal wells. In addition, the tube is required to carry its own weight and the weight of any attached components as it is suspended for 1,000 ft or more in a well bore and to be able to have high pulling capability to extract tools or to overcome being struck from sand and circulating solids which have collapsed around the tube. Such loads in the case of coiled tubing in subterranean wells may be in excess of 20,000 pounds. In other applications the tubing must also be capable of carrying high torsion loads. For example, one embodiment of the invention may include a composite tube and pipeline system capable of lifting from a well bore, as well as transporting horizontally for distances in excess of 1,000 ft., viscous multi-phase fluids such as heavy oil.

In forming composite structures, several well known techniques may be used such as pultrusion, fiber winding, braiding and molding. In pultrusion, fibers are drawn through a resin impregnating apparatus, then through dies to provide the desired shape. Alternatively, the resin may be injected directly within the die. Heat forming and curing structures are provided in conjunction with the dies. In fiber winding, the various layers forming the composite structure are each formed by winding or wrapping fibers and a polymer matrix around a mandrel or some other underlying structure that provide a desired shape. Successive composite layers may then be applied to underlying composite layers. A triaxial braiding structure may be manufactured using the fiber winding techniques disclosed in U.S. Pat. No. 5,188,872 to Quigley, and U.S. Pat. No. RE 35,081 to Quigley, the entire disclosures of which is incorporated herein by reference in their entirety.

Multi-phase viscous fluids such as crude oil may often be abrasive, resulting in the erosion of any pipeline system in which the oil is transported. To counter this, in one embodiment, one or more inner layers of an example spoolable pipe may be manufactured from a wear resistant material to provide an improved erosion barrier to prevent excessive wear on the pipe resulting in a failure of the pipe system. Additional layers may also provide beneficial thermal or mechanical properties, such as thermal insulation or wear resistance, or external abrasion resistance, for the transport of such fluids at elevated temperatures. In one embodiment of the invention one or more layers may be constructed from a material selected from the group including, but not limited to, insulation materials, fiber blankets, foamed polymers, foamed thermosets, foamed thermoplastics, gels, composite materials, elastomers, or combinations thereof. The thermoplastic foams may include, but is not limited to, a high density polyethylene (HDPE), cross-linked polyethylene (PEX), polyvinylidene fluoride (PVDF), polypropylene, nylon, and combinations thereof. The thermoset insulation may include urethanes, such as, but not limited to, a polyurethane, and a carbamate, such as ethyl carbamate.

In one embodiment, the reinforcing layer may include at least one first layer of helical reinforcing fiber. The at least one first layer of helical reinforcing fiber may be applied at a helical angle of between about 30° to about 70°. The reinforcing layer may also include at least one second helically extending fiber. In one embodiment, the at least one first layer of helical reinforcing fiber may be embedded within a polymeric matrix, such as, but not limited to, a thermoplastic epoxy. In another embodiment all the reinforcing layers may be laid dry with no matrix, and the fibers may or may not have a protective coating applied. The reinforcing layer may include a material such as, but not limited to, a glass, a carbon, an aramid, a basalt, a ceramic, a metallic strand, a wire, a tape, a polymeric material, and combinations thereof. In one embodiment, the reinforcing layer includes two layers, a first layer oriented at one positive helix angle relative to the longitudinal axis, and the second layer in with the same helix angle, but minus orientation. The helix angles could also change from layer to layer in within the reinforcing layer. In one embodiment, the reinforcing layer may include an even number of layers of counter wound helically applied reinforcing fibers, and the same angle but in positive and negative orientations relative to the longitudinal axis. In one embodiment, the reinforcing layer may include multiple layers of helically applied reinforcing fibers, each of which may be oriented with either a positive or negative helical orientation.

A heating element may be placed external to the inner layer of the spoolable pipe to provide a heat source to raise the temperature of the fluid and/or to maintain the fluid at an elevated temperature throughout the length of the spoolable pipe. The heating element may, for example, include one or more heating devices adapted to provide a heating source through induction, radiation, conduction, or convection. Example heating devices may include elements such as, but not limited to heat tape, heat bands, wire, insulated wire, heating blankets, and heating coils that may be embedded within the spoolable pipe, for example between the reinforcing layer and an insulation layer.

In an alternative embodiment, the heating elements may be embedded within a layer of the spoolable pipe, or be placed between any two other layers of the spoolable pipe, such as, but not limited to, between the reinforcing layer and the insulation layer.

The heating elements may be placed at discrete locations along the length of the pipe or extended linearly along the length of the pipeline and/or be coiled around the central axis of the pipeline, or spiraled helically In one embodiment, a plurality of heating elements may be provided at different circumferential positions on the spoolable pipe. These heating elements may include electrically powered heating elements, chemically powered heating elements, mechanically powered heating elements, and/or heating elements powered by any other appropriate means. In one embodiment, there could be multiple layers of heating elements. These heating elements may be helically wound at different helical wind angles, such as, but not limited to, in equal, but opposite (plus and minus relative to neutral axis) helical orientations.

In one embodiment the heating element may include a separate pipe through which a separate heated fluid is passed. This pipe may be concentric with the inner pipe or include one or more separate, offset pipes.

In one embodiment, one or more heating elements may be adapted to provide a means for at least one of modifying, measuring, and controlling the temperature of a fluid being transported within the spoolable pipe. For example, one or more temperature sensors may be incorporated into the spoolable pipe to provide a measurement of the fluid temperature at various distances along the pipe. These sensors may be used to provide information to one or more control elements that may adjust the power to the heating device or devices to allow the fluid within the pipe to be raised to and/or maintained at the required temperature at all locations along the pipe.

One embodiment of the invention may include a spoolable pipe heated by one or more electrical cables. These cables may be positioned parallel to the longitudinal axis of the pipe and, for example, along one or a plurality of the inner pipe and/or reinforcing pipe surfaces. In an alternative embodiment, the heating elements may be configured to spiral or coil around the inner pipe. In another embodiment, the electrical cables may be helically oriented relative to longitudinal axis of the pipe.

In one embodiment, the electrical cable may produce heat through a Joule effect when appropriate current passes through it. In one embodiment, a plurality of cables may be regularly distributed around the periphery of the inner pipe and/or reinforcing pipe. In one example embodiment, the cables are distributed in four groups of three cables. This three-phase wiring system does not need a return cable and consequently, for a given tension, provides a maximal thermal power. Other appropriate arrangements of cables are also possible.

In one embodiment, an elongated heating element, or elements, may be formed from braided ribbon. This braided ribbon may be formed from materials including, but not limited to, bands (strips) of copper or aluminum, or copper wires covered with tin and/or nickel.

In one embodiment, a spoolable pipe may include one or more connection devices configured to maintain an electrical connection over a damaged or otherwise disabled section of pipe, thus allowing the heating of the pipe to be maintained on both sides of a damaged section. An example connector for a spoolable pipe is disclosed in U.S. patent application Ser. No. 10/442,680 to Brontzell et al., the entire disclosure of which is incorporated herein by reference in its entirety.

In one embodiment, the heating element, or elements, may provide a variable heat source that may provide variable heat to different locations along the length of a pipeline.

In another embodiment, due to the extensive length of these pipelines, a significant amount of electrical power may be required to provide the required heat to all points along the length of the pipeline. This may result in the need for very large heating elements to carry the required power. To avoid this problem, one embodiment of the invention may include a plurality of heating elements of discrete lengths spaced along the length of the pipeline. As a result, each length may be separately powered, thus minimizing the power carried by any one element.

In one embodiment, these discrete length heating elements may include discrete lengths of heat tape, heat bands, insulated wire, heating coils, and or any other appropriate heating element described herein. In another embodiment, the plurality of discrete heating elements may include heated pipe coupling elements that may couple two lengths of spoolable pipe together while providing a heat source at the coupling location.

In one embodiment, the plurality of discrete heating elements may be powered separately from a plurality of power sources. For example, a single power source may, in one embodiment, provide power to a single heating element or to a small group of heating elements. In an alternative embodiment, a single external power source could provide power to a larger group or even all of the discrete heating elements. Any appropriate electrical, chemical, geothermal, solar, or mechanical power source may be utilized, as required.

In embodiments wherein the pipeline is buried below ground, and even below the frost line, one or more heating elements may include extended connection elements, or 'tails,' adapted to provide a connection between the heating element within the spoolable pipe and an above-ground power source. As a result, the power source may be positioned in an easily accessible location thus, for example, allowing for easier maintenance, while still providing power to the heating elements, or allowing one or more sections of the heating elements to be intentionally disabled, or have the power reduced, to control the temperature of the contained fluid.

In one embodiment, one or more layers of insulation may be placed outside the heat source to insulate the interior of the spoolable pipe and increase the thermal efficiency of the system. The outer layer of insulation may include one or more layers of a wrapped material, such as a fiberglass blanket or matting layer. Alternatively, or in addition, the external insulation may include an extruded material, a cast material, a molded material, and combinations thereof.

The outer layer of insulation may also include a non-structural insulation material such as, but not limited to, expanded polymers trapped between the inner pressure containing pipe (consisting at least of the inner layer and reinforcing layer) and an external protection layer. Example polymer and particle compositions suitable for use as a non-structural insulation material are disclosed in U.S. Provisional Patent Application No. 60/658,955 to Wideman et al, the entire disclosure of which is incorporated herein by reference in its entirety. In an alternative embodiment, insulation may include a polymeric foam, a gel, a composite material, a fiberglass material, and combinations thereof.

One embodiment of the invention may include an external protection layer. This external protection layer may be an constructed from one or more wear resistant materials and be adapted to protect the inner pressure containing pipe from the surrounding environment, whether the pipeline is above ground and exposed to the air, below ground, underwater, or in an subterranean well. The external protection layer may also provide additional structural support for the pipe system.

In one embodiment, the external protection layer may be constructed from an extruded material, a cast material, a wrapped material, a molded material, and combinations thereof. For example, the external protection layer may include one or more materials including, but not limited to, a polymeric material, a metallic material, a composite material, and combinations thereof.

In one embodiment of the invention, the external protection layer may be a separate, self-supporting structure through which an inner pressure containing pipe may be deployed. Deployment of the inner pressure containing pipe may include pulling or pushing the inner pressure containing pipe through the external protection layer before, during, or after the external protection layer has been laid. In one embodiment, upon deploying and centralizing the inner pressure containing pipe within the external protection layer, a non-structural insulation layer may be pumped or otherwise inserted into the cavity between the inner pressure containing pipe and the external protection layer to provide an insulation layer for the resulting pipe system. In an alternative embodiment, the external protection layer itself may provide sufficient insulation for the inner pressure containing pipe, without the need to provide an additional non-structural insulation layer. In another alternative embodiment, an outer layer of wrapped or otherwise formed insulation may be placed on the inner pressure containing pipe prior to deploying the inner pressure containing pipe within the external protection layer to provide an insulation layer for the system. In a further alternative embodiment, both wrapped external insulation and non-structural expanded polymer insulation may be utilized in a single pipe.

In one embodiment, a free standing external protection layer may include an inner liner, an insulation layer, and an external wear resistant layer. In one embodiment, a heated fluid is pumped through the annulus created between the inner diameter of the external protection layer, and the outer diameter, of the inner fiber reinforced spoolable pipe.

One embodiment of the invention may also include a spoolable pipe with a fiber optic cable and/or optical sensor embedded therein. An example spoolable pipe incorporating a fiber optic cable and optical sensor is disclosed in U.S. Pat. No. 6,004,639 to Quigley et al., the entire disclosure of which is incorporated herein by reference in its entirety. In one embodiment, one or more optical fibers may be embedded within a wall of the spoolable pipe and extend lengthwise along at least a portion of the length of a spoolable pipe. One or more optical sensors may be integrally formed with the optical fiber to provide a means of sensing a condition within the spoolable pipe. The optical sensor may be connected to the optical fiber for signal communication. As a result, the optical sensor may respond to an ambient condition of the spoolable pipe and communicate a signal responsive thereto along the optical fiber to a monitoring, controlling, and/or warning device.

Figure 2:
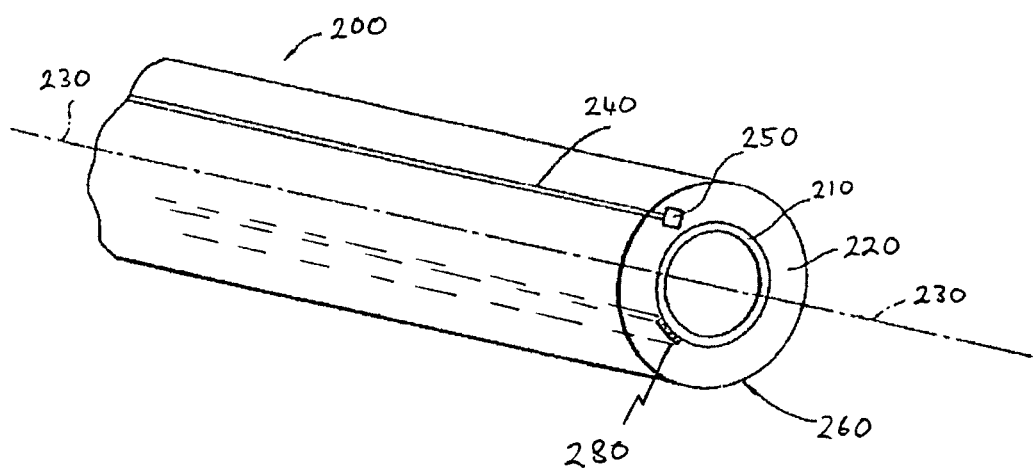
FIG. 2 is a schematic perspective view of a spoolable pipe with an optical sensor and a heating element, in accordance with one embodiment of the invention.

One example embodiment of a spoolable pipe including an optical sensor is shown in FIG. 2. FIG. 2 illustrates a tubular member, such as a composite spoolable pipe or tube 200, constructed of a substantially fluid impervious pressure barrier 210 and a composite layer 220. The composite coiled tube is generally formed as a member elongated along axis 230. The coiled tube may have a variety of tubular cross-sectional shapes, including circular, oval, rectangular, square, polygonal, and the like. The illustrated tube has a substantially circular cross-section. The composite tube also includes an energy conductor 240 extending lengthwise along the tubular member, and a sensor 250 mounted with the tubular member.

The sensor 250 is a structure that senses either the absolute value or a change in value of a physical quantity. Exemplary sensors for identifying physical characteristics include acoustic sensors, optical sensors, mechanical sensors, electrical sensors, fluidic sensors, pressure sensors, temperature sensors, strain sensors, and chemical sensors.

As further illustrated in FIG. 2, the composite layer 220 and the pressure barrier 210 constitute a wall 260 of the tubular member 200. The energy conductor 240 is embedded within the wall 260, and the sensor 250 is mounted within the wall 260 of the tubular member 200. The sensor is connected with the energy conductor such that a signal generated by the sensor may be communicated by way of the energy conductor 240. For instance, the sensor 250 may generate a signal responsive to an ambient condition of the tubular member 200 and the sensor may communicate this signal on the energy conductor 240.

The spoolable composite pipe or tube 200, may also include one or more heating elements 280. This heating element may take any or the forms described herein. In one embodiment, the spoolable pipe 200 may also include additional layers, such as, but not limited to, one or more external protection layers.

Figure 3:
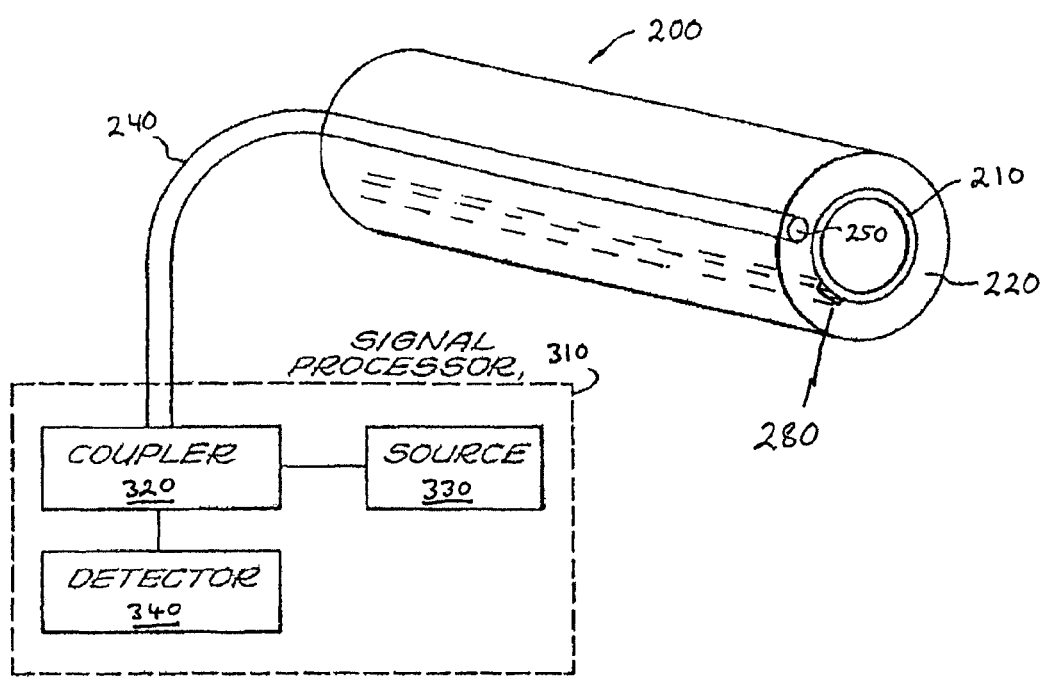
FIG. 3 is a schematic perspective view of a spoolable pipe with an optical fiber and a heating element, in accordance with one embodiment of the invention.

One example embodiment of a spoolable pipe including an optical sensor connected to a signal processor is shown in FIG. 3. FIG. 3 illustrates a composite tubular member 200 having a heating element 280 along with an energy conductor 240 connected to a signal processor 310. The energy conductor 240 is embedded within the composite tubular member 200. The signal processor is shown, in accordance with one aspect of this embodiment, as including an optional coupler 320, a source 330, and a detector 340. The signal processor may be positioned external to the composite tubular member 200, or the signal processor may be embedded within the composite tubular member.

The signal processor 310 receives data from the sensor 250 in the form of energy transmitted over the energy conductor 240. The signal processor then processes the received signal. The processing performed by the signal processing may include transforming the signal, filtering the signal, sampling the signal, or amplifying the signal. The operations performed by the signal processor 310 generally enhance the understanding of the signal transmitted over the energy conductor 240. For instance, the signal processor 310 may amplify and retransmit the signal over the energy conductor 240, i.e. the signal processor may act as a repeater circuit.

In another aspect of the invention, the signal processor may include a source 330 for transmitting an energy signal over the energy conductor 240, and a detector 340 for receiving an energy signal from the energy conductor 240. The signal processor may also include an optional coupler 320 for interfacing or multiplexing the source 330 and the detector 340 with the energy conductor.

The energy signal transmitted by the source 330 is placed on the energy conductor 240 by the coupler 320. The energy signal reaches the sensor 250 and is modified by the interaction between the sensor 250 and the ambient conditions of the composite tubular member 200. The sensor transmits the modified energy signal over the energy conductor 240. The coupler 320 then interfaces the detector 340 with the energy conductor 240 so that the detector 340 may identify the patterns in the modified energy signal. The detector determines the ambient conditions sensed by the detector 340 by comparing the properties of the energy signal transmitted by the source 330 with the properties of the modified energy signal.

In one embodiment, the optical sensor may be an interferometric sensor, an optical intensity sensor, a light scattering sensor, a spectral transmission sensor, a radiative loss sensor, a reflectance sensor, or a modal change sensor. In other embodiments, the optical sensor may include an intensity sensor that measures changes in the intensity of one or more light beams and/or an interferometric sensor that measures phase changes in light beams caused by interference between beams of light. Optical intensity sensors may rely on light scattering, spectral transmission changes, microbending or radiative losses, reflectance changes, and changes in the modal properties of optical fiber to detect measurable changes.

In one embodiment, the optical sensor may include an optical chemical sensor that may utilize fiber optics to perform remote spectroscopy (either absorption or fluorescence) of a substance.

In another embodiment, the optical sensor may include one or more optical temperature sensors, including those sensors that: remotely monitor blackbody radiation; identify optical path-length changes, via an interferometer, in a material having a known thermal expansion coefficient and refractive index as a function of temperature; monitor absorption characteristics to determine temperature; and monitor fluorescence emission decay times from doped compositions to determine temperature. For instance, optical fibers having a Bragg Grating etched therein may be used to sense temperature with an interferometer technique.

In one embodiment, an optical sensor may include a Bragg Grating that may also be used to measure strain. Particularly, a refractive index grating may be created on a single-mode optical fiber and the reflected and transmitted wavelength of light from the grating may be monitored. The reflected wavelength of light varies as a function of strain induced elongation of the Bragg Grating. Other optical sensors that may be used to measure strain include sensors including stimulated Brillouin scattering and polarimetry in birefringent materials.

Hybrid sensors including optical fibers may also be used to detect electrical and magnetic fields. Typically, the optical fiber monitors changes in some other material, such as a piezo-crystal, that changes as a function of electrical or magnetic fields. For example, the optical fiber may determine dimensional changes of a piezoelectric or piezomagnetic material subjected to electric or magnetic fields, respectively. Bragg Gratings in an optical fiber may also be used to measure high magnetic fields.

Fiber optic sensors for measuring current, in which current is measured by observing the rotation of polarized light in the optical fiber, may also be used in one embodiment of the invention.

One embodiment of the invention may include one or more optical pressure sensors that rely on movable diaphragms, Fabry-Perot interferometers, or microbending. For example, the movable diaphragm may sense changes in pressure applied across the diaphragm using piezoresistors mounted on the diaphragm. The resistance of the piezoresistors varies as the diaphragm flexes in response to various pressure levels. Fabry-Perot interferometers may include two parallel reflecting surfaces, wherein one of the surfaces moves in response to pressure changes. The interferometers then detect the movement of the surface by comparing the interference patterns formed by light reflecting of the moving surface. Microbending sensors may be formed of two opposing serrated plates that bend the fiber in response to the pressure level. The signal loss in the fiber resulting from the movement of the opposing serrated plates may be measured, thereby sensing displacement and pressure change.

One embodiment of the invention may include an optical sensor for measuring displacement and position. For example, a simple optical sensor may measure the change in retroreflectance of light passing through an optical fiber due to movement of a proximal mirror surface.

Additionally, in one embodiment of the invention, one or more optical sensors may be employed to measure acoustics and vibration within a pipe or within the surrounding environment. For example, an optical fiber may be wrapped around a compliant cylinder. Changes in acoustic waves or vibrations flex the cylinder and in turn stress the coil of optical fiber. The stress on the optical fiber may be measured interferometrically and is representative of the acoustic waves or vibrations impacting the cylinder.

In an alternative embodiment, a mechanical sensor may be used in conjunction with, or in place of, an optical sensor. Mechanical sensors suitable for deployment within the pipe include, but are not limited to, piezoelectric sensors, vibration sensors, position sensors, velocity sensors, strain gauges, and acceleration sensors.

In a further alternative embodiment, one or more electrical sensor, fluidic sensor, and/or pressure sensor may be used. Electrical sensors may include, but are not limited to, current sensors, voltage sensors, resistivity sensors, electric field sensors, and magnetic field sensors. Fluidic sensors may include, but are not limited to flow rate sensors, fluidic intensity sensors, and fluidic density sensors. Pressure sensors may include, but are not limited to, absolute pressure sensors or differential pressure sensors, such as a semiconductor pressure sensor having a moveable diaphragm with piezoresistors mounted thereon. In a further alternative embodiment, a temperature sensor may be used in conjunction with, or in place of, an optical sensor. Example temperature sensors may include, but are not limited to, thermocouples, resistance thermometers, and optical pyrometers.

In one embodiment, an inner composite spoolable pipe, or other appropriate pipe, for transporting heated fluids under pressure may be enclosed within an external protection layer, such as a self-supporting external protection layer. It may be desirable, in some embodiments, to be able to extract and redeploy the inner composite spoolable pipe, either for means of repair, or inspection of the composite spoolable pipe, or one its constituent layers, such as, but not limited to, a heating element, measurement or control device, or a structural reinforcing layer. As such, one embodiment of the invention may include a method of extraction, repair, and/or installation of a spoolable pipe within a pipe system, such as a heated pipe system as described herein.

In one embodiment, this method may be used to extract, repair, and/or install a pipe system for transporting a fluid. To deploy this pipe system, firstly, an outer pipe, such as, but not limited to, an external protection layer, is buried in the ground using ditching, plowing, drilling, or other appropriate method. Subsequently, an inner pipe, such as, but not limited to, a multi-layer, composite spoolable pipe, is inserted into the outer pipe with the assistance of a wireline, or injector apparatus. In an alternative embodiment, the composite spoolable pipe may be injected or pulled inside the outer pipe before installation, and both pipes simultaneously installed in the ground using ditching, plowing, drilling, or other appropriate method.

In one embodiment, an annulus between the inner pipe and outer pipe may be at least equal to approximately 0.100 inches. In an alternative embodiment, the annulus between the inner pipe and outer pipe may be larger or smaller, as required, and may range, for example, from approximately 0.01 inches to approximately 1 inch. In one embodiment, the inner pipe may be place centrally or offset with respect to the outer pipe.

In one embodiment, in order to repair, replace, or inspect the inner pipe, such as an inner multi-layer spoolable pipe, the inner pipe may be extracted from the outer pipe by means of a winch, pulling device, spooling apparatus, or other appropriate mechanical device. An example system and method for us in repairing, replacing, inspecting, or otherwise rehabilitating a spoolable is disclosed in U.S. Pat. No. 6,978,804 to Quigley et al., the entire disclosure of which is incorporated herein by reference in its entirety.

Figure 4:
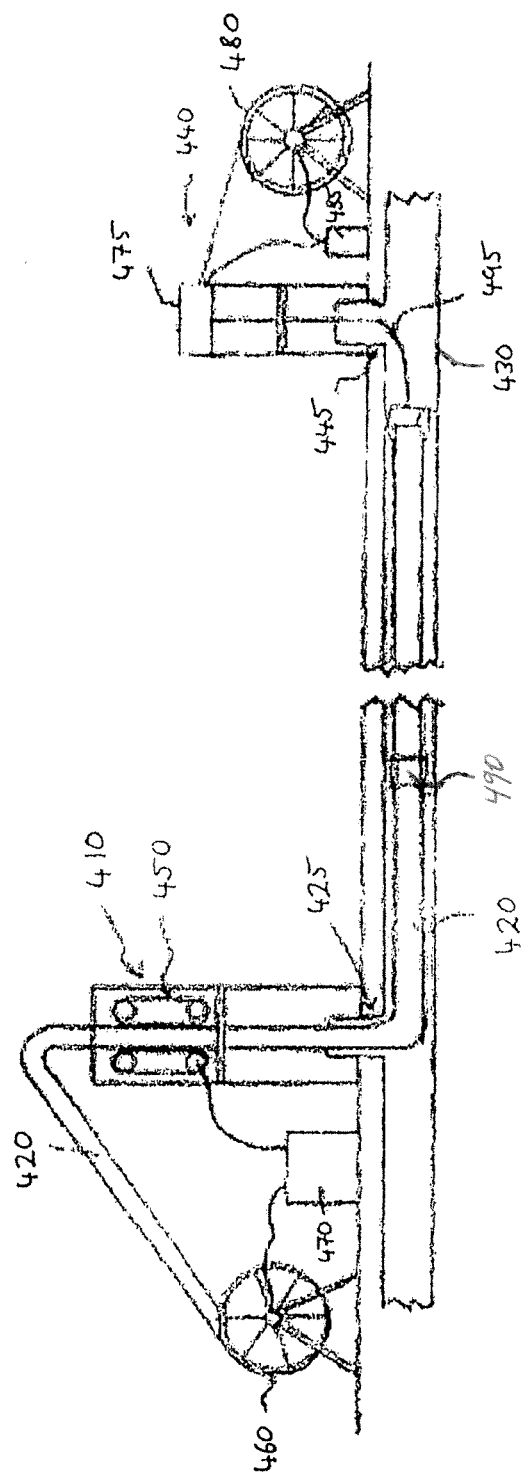
FIG. 4 is a schematic perspective view of a system for rehabilitating a spoolable pipe with a heating element, in accordance with one embodiment of the invention.

One example embodiment of a system for repairing, replacing, or inspecting an inner pipe is shown in FIG. 4. The system 400 includes a first device 410 that is configured to push a length of a second pipe 420 into a first access point 425 of a first pipe 430. The system 400 further includes a second device 440 that is configured to pull the second pipe 420 through a second access point 445 in the first pipe 430. The system 400 operates to push and/or pull the second pipe 420 through the first pipe 430. During operation, the first pipe 430 acts as a conduit for installing the second pipe 420. The second pipe 420, once installed, may be utilized to transport fluids in place of the first pipe 430, thereby rehabilitating the pipeline. Alternatively, the first pipe 430 may act as an external protection layer for the second pipe 420.

The systems and methods for pipeline rehabilitation described herein, including the exemplary system 400, are particularly suited for rehabilitation of buried and undersea pipeline and other pipelines in which access to the pipeline may be restricted. In the illustrated embodiment, for example, the first pipe 430 comprising the pipeline is buried underground. One skilled in the art will appreciate that the systems and methods described herein are not limited to buried or undersea pipelines but instead may be utilized to effect rehabilitation of any installed pipelines. Likewise, the orientation of the first device 410 and the orientation of the second device 440 relative to the first pipe 420, and in one embodiment, relative to the ground, may be varied. For example, the first device 410 and the second device 440 may be oriented to introduce the second pipe 420 at an angle proximate to 90° relative the first pipe 430 as illustrated in FIG. 4, at angle proximate to 0° (i.e., parallel) to the first pipe 430, or at any other angle.

Continuing to refer to FIG. 4, the first device 410 of the system 400 may include an injector 450 that operates to engage the exterior surface of the second pipe 420 and push the second pipe 420 into the first access point 425 of the first pipe 430. The second pipe 420 may be fed to the injector 450 by a hydraulically or otherwise operated reel 460 onto which the second pipe 420 may be spooled. The reel 460 may cooperate with the injector 450 to push the second pipe 420 into the first pipe 430. Alternatively, the injector 450 or the reel 460 may independently operate to push the second pipe 420 into the first pipe 430. One skilled in the art will appreciate that the first device 410 is not limited to the injector 450 and or the reel 460 illustrated in FIG. 4. Any device suitable for displacing pipe, rope, cords, or other lengthy products may be utilized as the first device. A push control station 470 coupled to the injector 450 and/or the reel 460 may be provided to control the operation of the injector and the reel. The second device 440 may include a capstan 475, reel 480, a rope 495, and a control station 485. At least one of the first pipe 430 and the second pipe 420 may include a heating element 490, such as, but not limited to, any of the heating elements described herein.

In one embodiment, a system for rehabilitating a pipeline including a first pipe may include a first device coupled to a first portion of a second pipe and configured to push a length of the second pipe into a first access point of the first pipe. The system may also include a second device coupled to a second portion of the second pipe and configured to pull the second pipe through a second access point in the first pipe, the second access point spaced a distance from the first access point. In one embodiment, the first pipe is flooded with a fluid, and the second pipe further may also include a buoyancy control layer formed of a material having a density selected to adjust the overall density of the second pipe to provide a desired buoyancy to the second pipe. In an alternative embodiment, the first pipe may include a fluid selected such that the second pipe has about a neutral or minimal negative buoyancy in the fluid. The second pipe may include a buoyancy control layer formed of a material having a density selected to adjust the overall density of the second pipe.

Production of viscous, crude oils termed generally, "heavy oil," may often use progressive cavity pumps to lift the heavy oil, to the surface. However, typically, once the crude oil is lifted to surface, it is pumped into a heated tank, whereby the oil, water, and sediments are generally separated by gravity, and then they must often be transported by truck. One embodiment of the invention may include a novel production system using composite spoolable pipe to lift a viscous, multi-phase fluid from a subterranean oil well and transport the resulting fluid away from the oil well drill site without the need for additional processing and/or road transportation.

For example, one embodiment of the invention may include a system that may both lift a viscous fluid, such as, but not limited to, a fluid produced from a subterranean heavy oil well, to the surface, and then transport the viscous fluid horizontally over potentially extensive distances.

An example production system for lifting and transporting a viscous, multi-phase fluid, such as heavy oil, may include a rotatable spoolable fiber reinforced composite pipe. In one embodiment, this spoolable pipe may act as a torque, or drive shaft, connected to a surface drive, and may be coupled to a pump, such as a sub-surface progressive cavity pump or other appropriate pumping system.

In one embodiment, the spoolable fiber reinforced composite pipe may be installed concentrically within a second composite spoolable pipe, thereby forming an annulus. This annulus may be used to pump fluids from a well hole to the surface. The spoolable fiber reinforced pipe may, in one embodiment, include one or both of an external insulation and/or wear layer.

In one embodiment, a fitting, located at or near the surface, may be used to connect the annulus with a further pipe system, such as any of the pipe systems described herein. In one embodiment, the pipe system may include a substantially horizontally installed inner pipe used to transport a viscous fluid. At least one of the spoolable pipes within this production system may include one or more heating elements adapted to heat the viscous fluid and/or maintain the viscous fluid at an elevated temperature, such as, but not limited to, a temperature above their ambient temperature sub-surface temperature.

In one embodiment, an instrument sub-assembly could be included, for example above the sub-surface pump, that could measure and communicate with one or more system control properties such as a temperature, a pressure (for example, a pump outlet pressure), flow, vibration, or a viscosity. The system may include one or more heating element, including, but not limited to, any of the heating elements described herein. A means of monitoring and/or controlling a system parameter, such as the temperature within one or more of the spoolable pipes, may also be employed.

In one embodiment, a spoolable pipe may be coupled to a surface mechanical drive which provides rotary power, allowing the spoolable pipe to rotate. The spoolable pipe may be coupled to the rotating pump assembly sub-surface, resulting in the annulus of the rotating spoolable pipe being used to lift one or more fluids directly. As a result, in this embodiment the internal composite spoolable pipe would not be required. In this case, a heating element could be located within the composite spoolable pipe, and for example inside of the outer insulation layer.

Example spoolable pipes including heating elements are shown in FIGS. 5A through 8B. In alternative embodiment, any of the heating elements, or heating element systems, described herein may be used with the configurations of FIGS. 5A to 8B, or any other appropriate configuration of spoolable pipe and heating element system.

FIGS. 5A and 5B show a spoolable pipe 500 including an inner layer 510, a reinforcing layer 520, and an insulation layer 530. A heating element 540 is positioned between the inner layer 510 and the reinforcing layer 520. In an alternative embodiment, the heating element 540 may be located at any location within the spoolable pipe 500, either between two layers or within one of the layers.

FIGS. 6A and 6B show a spoolable pipe 500 including an inner layer 510, a reinforcing layer 520, and an insulation layer 530. A plurality of heating elements 640 are positioned between the inner layer 510 and the reinforcing layer 520. In an alternative embodiment, the heating elements 640 may be located at any location within the spoolable pipe 500, either between two layers or within one of the layers. In an alternative embodiment, a greater or lesser number of heating elements may be used.

FIGS. 7A and 7B show a spoolable pipe 500 including an inner layer 510, a reinforcing layer 520, and an insulation layer 530. A heating element 740 is wrapped between the inner layer 510 and the reinforcing layer 520. In an alternative embodiment, the heating elements 740 may be wrapped between any two layers or within any one of the layers.

FIGS. 8A and 8B show a spoolable pipe 500 including an inner layer 510, a reinforcing layer 520, and an insulation layer 530. A plurality of discrete heating elements 840 are wrapped between the inner layer 510 and the reinforcing layer 520. In an alternative embodiment, the heating elements 840 may be wrapped between any two layers or within any one of the layers. A tail 850 may connect one or more discrete heating elements 840 to a power source. The length and configuration of these heating elements may be selected as required for a particular embodiment. In an alternative embodiment, the discrete heating elements may take any of the forms described herein.

Figure 9:
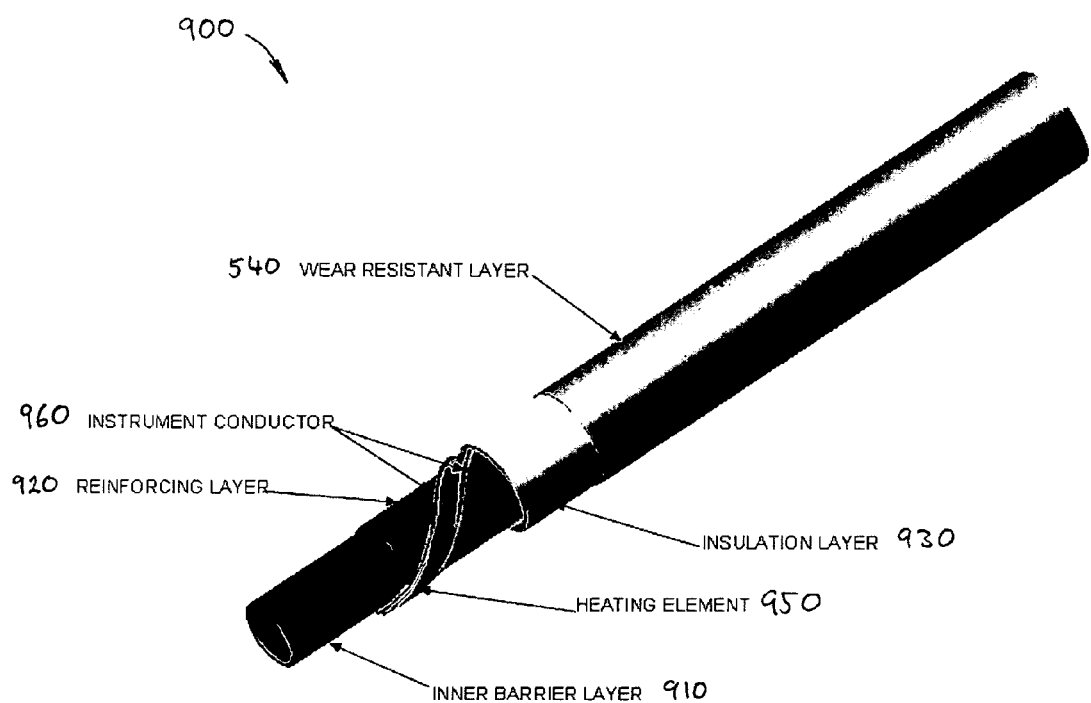
FIG. 9 is a schematic perspective view of a spoolable pipe with a wrapped heating element, in accordance with one embodiment of the invention.

FIG. 9 shows a spoolable pipe 900 including an inner barrier layer 910, a reinforcing layer 920, an insulation layer 930, and a wear resistant outer layer 540. A heating element 950 is wrapped between the reinforcing layer 920 and the insulating layer 930 in a spiral or helix pattern. An instrument conductor 960 is also wrapped between the reinforcing layer 920 and the insulating layer 930. These instrument conductors 960 can include one or more optical and/or electrical wires designed to provide power and/or a communication path between an instrument and a remote monitoring device. In an alternative embodiment, the instrument conductors 960 can provide a communication path one or more devices located at each end of the spoolable pipe 900. In one example embodiment, the spoolable pipe 900 may include a 3 inch diameter pipe. In an alternative embodiment, a larger or smaller diameter pipe can be used.

Figure 10A:
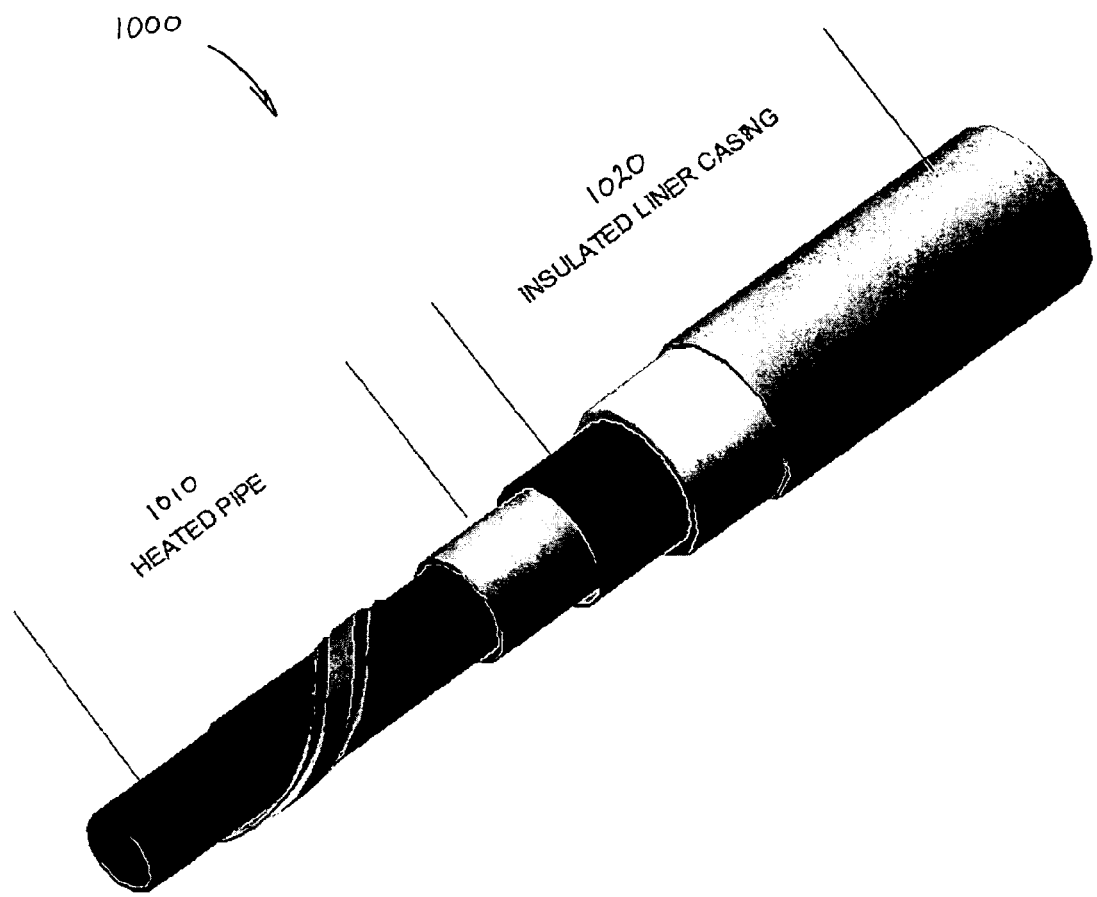
FIG. 10A is a schematic perspective view of a spoolable pipe and insulated liner casing, in accordance with one embodiment of the invention.
Figure 10B:
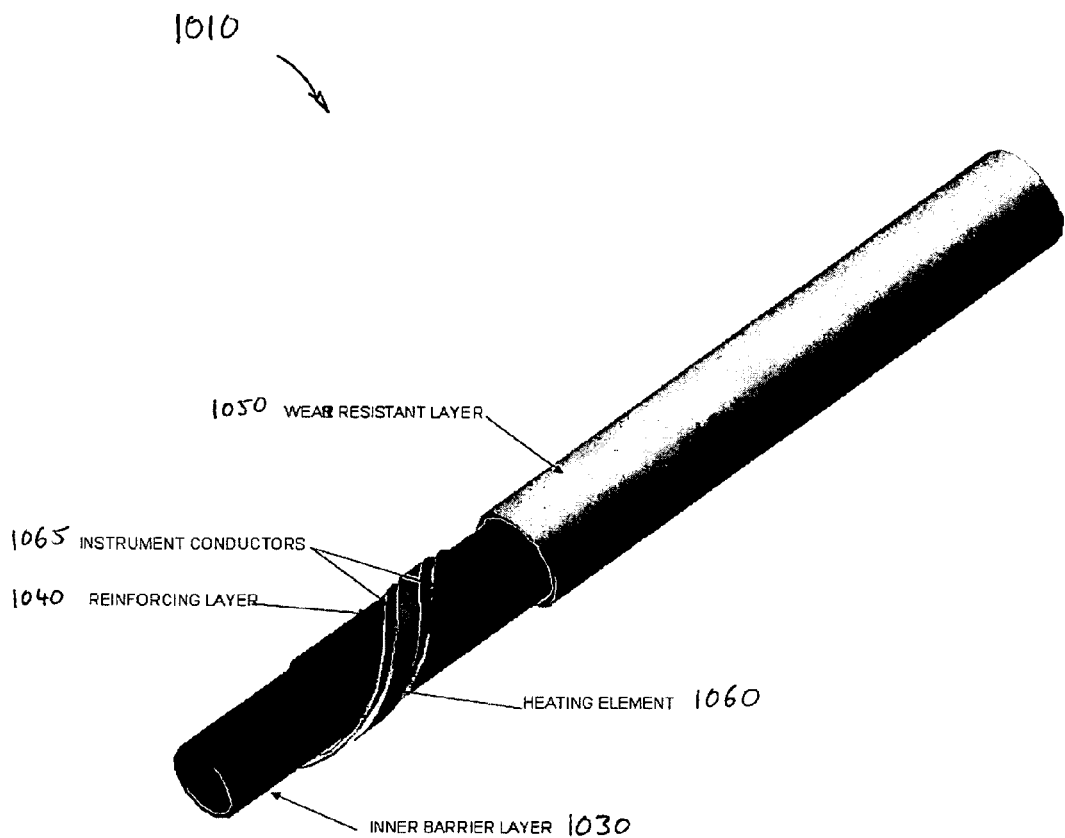
FIG. 10B is a schematic perspective view of the spoolable pipe of FIG. 10A.
Figure 10C:
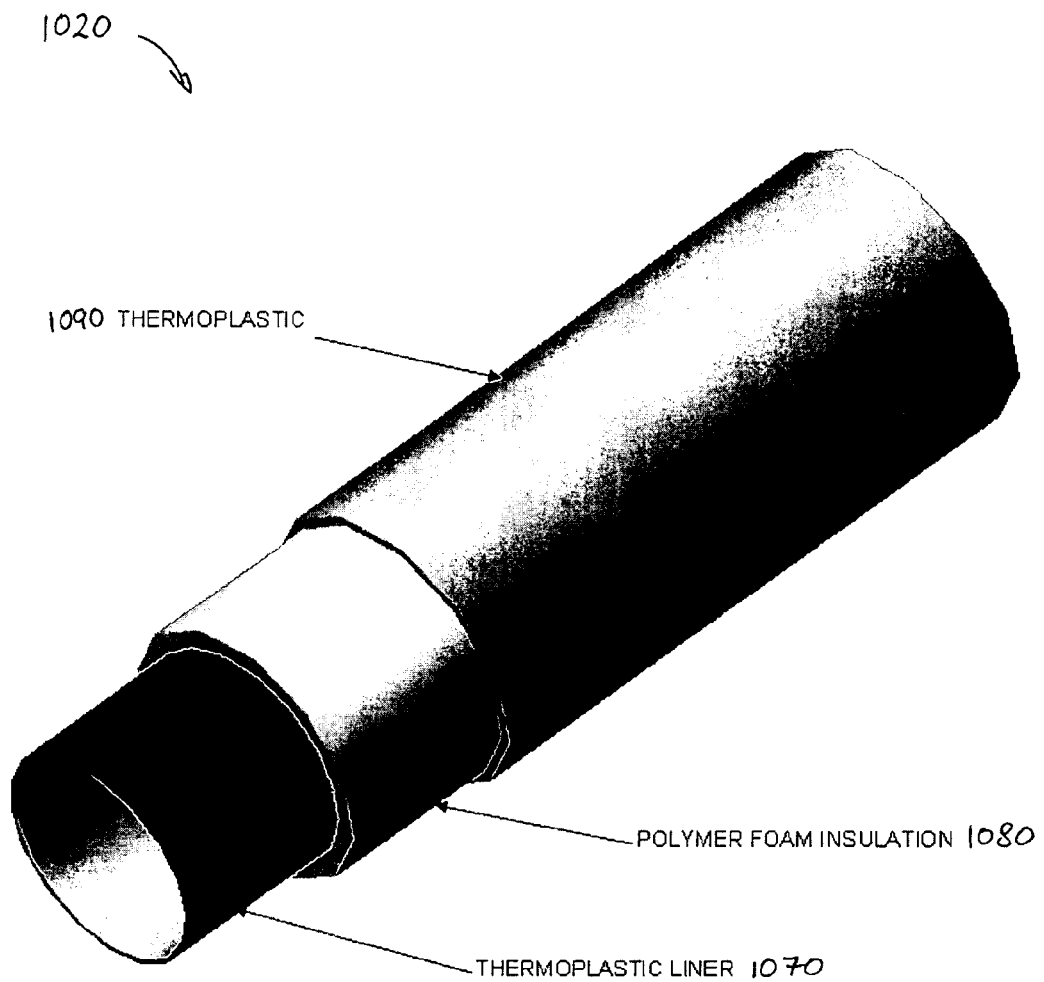
FIG. 10C is a schematic perspective view of the insulated liner casing of FIG. 10A.

FIGS. 10A through 10C shows a system of spoolable pipes 1000 including a heated pipe 1010 and an insulated liner casing 1020. The heated pipe 1010 includes an inner barrier layer 1030, a reinforcing layer 1040, and a wear resistant outer layer 1050. The heated pipe 1010 also includes a heating element 1060 and instrument conductors 1065 wrapped between the reinforcing layer 1040 and the wear resistant layer 1050. In one example embodiment, the heated pipe 1010 may include a 3 inch diameter pipe.

External protection for the heated pipe 1010 is provided by an insulated liner casing 1020. This insulated liner casing 1020 may include a thermoplastic liner 1070, a polymer foam insulation layer 1080, and a thermoplastic outer later 1090. These layers may be constructed from any of the materials discussed hereinabove. In one embodiment, the polymer foam insulation layer 1080 may be about 0.5 inches thick. In another embodiment, a thinner or thicker polymer foam insulation layer 1080 may be included, as required.

In one embodiment, the inner diameter of the insulated liner casing 1020 may be greater than the outer diameter of the heated pipe 1010, thus allowing the heated pipe 1010 to be moved through the insulated liner casing 1020, thus allowing for, for example, the deployment, rehabilitation, and/or replacement of the heated pipe 1010 within the insulated liner casing 1020. In one embodiment, a heated gas or fluid may be passed through an annulus between the heated pipe 1010 and the insulated liner casing 1020. This may be used to heat, and or maintain the temperature of, the fluid within the heated pipe, or provide a channel allowing for two separate fluids and/or gases to be transported within one pipe system.

FIGS. 11A through 11B shows a system 1100 for transporting a fluid at an elevated temperature. The system 1100 includes a fiber reinforced insulated and heated spoolable pipe 1110 positioned within a steel casing 1120. This spoolable pipe 1110 can, for example, be located "down-hole" in a well hole. A pump assembly 1130 and an anchoring element 1140 are located at a lower portion of the spoolable pipe 1110. The spoolable pipe 1110 also includes a sensor sub-assembly 1150, including sensors such as, but not limited to, a pressure sensor, a temperature sensor, and/or a flow sensor. In an alternative embodiment, the sensor sub-assembly may include any of the sensors and elements described hereinabove.

In one embodiment, an inner pipe 1160 is placed within the spoolable pipe 1110, thus providing an annulus 1170 between the outer diameter of the pipe 1160 and an inner diameter of the spoolable pipe 1110.

A drive assembly 1180 is positioned at an upper section of the spoolable pipe 1110 to provide rotational power to at least one of the pipe 1160 and the spoolable pipe 1110. As a result, the annulus 1170 can transport a fluid in response to a rotation of one or more of the pipes. In one embodiment, the spoolable pipe 1110 includes an insulation layer. In another embodiment, no insulation layer is included in the down-hole pipe. In one embodiment, a heater string may be located within the annulus 1170. In another embodiment, no heater element is required within the annulus 1170.

In one embodiment, the heater string may include one or more tubular elements placed within the annulus. This heater string may be configured to carry one or more separate heated fluids to provide a heat source to heat a fluid within the annulus, and/or maintain the fluid at an elevated temperature, for example as an alternative to, or in addition to, an electrical heating element. This heater string may be incorporated into any of the embodiments described herein, including any horizontal and/or vertical pipe application, and can be positioned within an inner pipe, within an annulus between two pipes, or embedded within one or more layers of a composite pipe structure.

The system 1100 can also include a fitting 1185 connecting the annulus 1170 to a second, substantially horizontally disposed, spoolable pipe 1190. This second spoolable pipe 1190 may include a heated pipe and/or a dual pipe system, as described hereinabove.

It should be understood that alternative embodiments, and/or materials used in the construction of embodiments, or alternative embodiments, are applicable to all other embodiments described herein.

All publications and patents mentioned herein, are hereby incorporated by reference in their entirety as if each individual publication or patent was specifically and individually incorporated by reference. In case of conflict, the present application, including any definitions herein, will control.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A fiber reinforced spoolable pipe for transporting a viscous subterranean heavy oil well fluid at an elevated temperature above the ambient sub-surface temperature of the fluid, comprising:
   an inner layer;
   at least one reinforcing layer surrounding the inner layer;
   a plurality of separately powered discrete length heating elements placed at discrete locations along a length of the pipe at different circumferential positions, each of the plurality of separately powered discrete length heating elements positioned between the inner layer and the reinforcing layer and adapted to connect to an external power source, wherein each of the plurality of discrete length heating elements heat or maintain at the elevated temperature the fluid being transported through the spoolable pipe, and wherein each of the plurality of discrete length heating elements is selected from the group consisting of an inductive heating element, a radiative heating element, a heat tape, a heat band, and combinations thereof; and
   at least one insulation layer external to the reinforcing layer,
   wherein the spoolable pipe is adapted for operation below ground.

2. The spoolable pipe of claim 1, wherein the inner layer comprises a material selected from the group consisting of a polymeric material, a thermoplastic material, a thermoset material, a composite material, a metallic material, and combinations thereof.

3. The spoolable pipe of claim 1, wherein the inner layer comprises a thermoplastic material selected from the group consisting of high density polyethylene (HDPE), cross-linked polyethylene (PEX), polyvinylidene fluoride (PVDF), nylon, and combinations thereof.

4. The spoolable pipe of claim 1, wherein the reinforcing layer comprises at least one first layer of helical reinforcing fiber.

5. The spoolable pipe of claim 4, wherein the at least one first layer of helical reinforcing fiber is applied at a helical angle of about 30° to about 70°.

6. The spoolable pipe of claim 4, wherein the reinforcing layer further comprises at least one second helically extending fiber.

7. The spoolable pipe of claim 4, wherein the at least one first layer of helical reinforcing fiber is embedded within a polymeric matrix.

8. The spoolable pipe of claim 7, wherein the polymeric matrix comprises a thermoset epoxy.

9. The spoolable pipe of claim 1, wherein the at least one reinforcing layer comprises a material selected from the group consisting of a glass, a carbon, an aramid, a metallic strand, a wire, a tape, a polymeric material, and combinations thereof.

10. The spoolable pipe of claim 1, wherein the at least one insulation layer comprises at least one of an external structural insulation and a non-structural insulation.

11. The spoolable pipe of claim 1, further comprising an external protection layer.

12. The spoolable pipe of claim 10, wherein the at least one insulation layer comprises a material selected from the group consisting of a polymeric foam, a gel, a composite material, a fiberglass material, and combinations thereof.

13. The spoolable pipe of claim 10, wherein the at least one insulation layer comprises a material selected from the group consisting of an extruded material, a cast material, a wrapped material, a molded material, a foam material, and combinations thereof.

14. The spoolable pipe of claim 11, wherein the external protection layer comprises a material selected from the group consisting of a polymeric material, a metallic material, a composite material, a foam material, and combinations thereof.

15. The spoolable pipe of claim 11, wherein the external protection layer comprises a material selected from the group consisting of an extruded material, a cast material, a wrapped material, a molded material, and combinations thereof.

16. The spoolable pipe of claim 10, wherein the at least one insulation layer comprises expanded polymers.

17. The spoolable pipe of claim 11, wherein the at least one insulation layer is located between the at least one reinforcing layer and the external protection layer.

18. The spoolable pipe of claim 1, wherein the inner layer is substantially impervious to fluid.

19. The spoolable pipe of claim 1, wherein the at least one heating element is adapted to at least one of modify, measure, or control a temperature of a fluid being transported within the spoolable pipe.

20. The spoolable pipe of claim 1, wherein the plurality of discrete length heating elements are adapted to provide variable heating along at least a portion of the length of the spoolable pipe.

21. The spoolable pipe of claim 1, further comprising at least one electrical conductor extending lengthwise along the spoolable pipe and embedded within a wall of the spoolable pipe.

22. The spoolable pipe of claim 21, further comprising at least one sensor integrally formed with the electrical conductor.

23. The spoolable pipe of claim 22, wherein the electrical conductor is adapted to at least one of provide power to the sensor and provide a means of remotely communicating with the sensor.

24. The spoolable pipe of claim 22, wherein the at least one sensor is selected from the group consisting of an light sensor, a temperature sensor, a flow rate sensor, a viscosity sensor, a chemical sensor, a pressure sensor, a mechanical sensor, an electrical sensor, an optical sensor, and a power sensor.

25. The spoolable pipe of claim 1, further comprising at least one optical fiber extending lengthwise along the spoolable pipe and embedded within a wall of the spoolable pipe.

26. The spoolable pipe of claim 25, further comprising at least one optical sensor integrally formed with the optical fiber.

27. The spoolable pipe of claim 26, wherein the optical sensor is connected to the optical fiber for signal communication, and wherein the optical sensor responds to an ambient condition of the spoolable pipe and communicates a signal responsive thereto along the optical fiber.

28. The spoolable pipe of claim 26, wherein the at least one optical sensor is selected from the group consisting of an interferometric sensor, an optical intensity sensor, a light scattering sensor, a spectral transmission sensor, a radiative loss sensor, a reflectance sensor, and a modal change sensor.

* * * * *